US008682386B2

(12) United States Patent
Sasaki et al.

(10) Patent No.: US 8,682,386 B2
(45) Date of Patent: Mar. 25, 2014

(54) DUAL-MODE SYSTEM AND DUAL-MODE WIRELESS TERMINAL

(75) Inventors: Hiroshi Sasaki, Kawasaki (JP); Kenichi Namatame, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1848 days.

(21) Appl. No.: 11/094,611

(22) Filed: Mar. 30, 2005

(65) Prior Publication Data

US 2005/0181822 A1 Aug. 18, 2005

Related U.S. Application Data

(63) Continuation of application No. PCT/JP03/04368, filed on Apr. 7, 2003.

(51) Int. Cl.
*H04M 1/00* (2006.01)

(52) U.S. Cl.
USPC ............ 455/552.1; 455/553.1; 455/442; 455/437; 455/439; 455/453; 370/331; 370/335; 370/337; 370/342; 370/347

(58) Field of Classification Search
USPC .......... 455/552.1, 439, 436, 502, 553, 556, 455/562.1, 276.1; 370/331, 335, 330, 370/280–281
See application file for complete search history.

(56) References Cited

U.S. PATENT DOCUMENTS

| | | | |
|---|---|---|---|
| 6,246,886 B1 * | 6/2001 | Oliva | 455/426.1 |
| 6,289,221 B1 * | 9/2001 | Ritter | 455/447 |
| 6,411,825 B1 * | 6/2002 | Csapo et al. | 455/561 |
| 6,526,091 B1 * | 2/2003 | Nystrom et al. | 375/142 |
| 6,584,116 B1 | 6/2003 | Gourgue et al. | |
| 7,224,676 B2 * | 5/2007 | Uebayashi et al. | 370/330 |
| 7,778,641 B1 * | 8/2010 | Willars et al. | 455/436 |
| 2002/0037726 A1 | 3/2002 | Czaja et al. | |
| 2002/0151325 A1 * | 10/2002 | Fitton et al. | 455/553 |

(Continued)

FOREIGN PATENT DOCUMENTS

| | | |
|---|---|---|
| EP | 0 954 195 | 11/1999 |
| EP | 1 142 407 | 10/2001 |

(Continued)

OTHER PUBLICATIONS

International Search Report dated Jul. 8, 2003.

(Continued)

*Primary Examiner* — Kiet Doan
*Assistant Examiner* — Michael T Vu
(74) *Attorney, Agent, or Firm* — Katten Muchin Rosenman LLP

(57) ABSTRACT

A base station of a first mobile communication mode communicates with a terminal in the first mobile communication mode and transmits a radio signal in a second mobile communication mode, and a base station of the second mobile communication mode communicates with the terminal in the second mobile communication mode and transmits a radio signal in the first mobile communication mode. A first unit of a dual-mode portable terminal communicates with the base station of the first mobile communication mode in the first mobile communication mode, receives the radio signal of the first mobile communication mode transmitted from the base station of the second mobile communication mode and determines based upon this radio signal whether the base station of the second mobile communication mode exists. Similarly, a second unit of the dual-mode portable terminal determines whether the base station of the first mobile communication mode exists.

10 Claims, 21 Drawing Sheets

(56) References Cited

U.S. PATENT DOCUMENTS

| | | | | |
|---|---|---|---|---|
| 2003/0137958 A1* | 7/2003 | Yano et al. | | 370/335 |
| 2003/0207688 A1* | 11/2003 | Nikkelen | | 455/439 |
| 2004/0042437 A1* | 3/2004 | Sheynman et al. | | 370/342 |
| 2004/0142723 A1* | 7/2004 | Shippee | | 455/552.1 |
| 2004/0203965 A1* | 10/2004 | Robinson | | 455/502 |
| 2005/0255892 A1* | 11/2005 | Wong et al. | | 455/562.1 |

FOREIGN PATENT DOCUMENTS

| | | |
|---|---|---|
| GB | 2 321 161 | 7/1998 |
| JP | 11-298964 | 10/1999 |
| JP | 2000-092541 | 3/2000 |
| JP | 2000-92541 | 3/2000 |
| JP | 2000-201369 | 7/2000 |
| JP | 2002-535902 | 10/2001 |
| JP | 2002-232930 | 8/2002 |
| JP | 2003-169379 | 6/2003 |
| WO | WO 99/38297 | 7/1999 |
| WO | WO 99/39246 | 8/1999 |
| WO | 00/42808 | 7/2000 |

OTHER PUBLICATIONS

Notification of Reasons for Refusal dated Nov. 13, 2007, for the corresponding Japanese Application 2004-570555.

Notification of Reasons for Refusal dated Jun. 29, 2010, from the corresponding Japanese Application.

Supplementary European Search Report dated Dec. 17, 2010, from the corresponding European Application.

* cited by examiner

| GROUP NO. | PATTERN |
|---|---|
| 1 | $C_S^{1,0}, C_S^{1,1}, C_S^{1,2}, \ldots\ldots\ldots C_S^{1,14}$ |
| 2 | $C_S^{2,0}, C_S^{2,1}, C_S^{2,2}, \ldots\ldots\ldots C_S^{2,14}$ |
| ⋮ | ⋮ |
| i | $C_S^{i,0}, C_S^{i,1}, C_S^{i,2}, \ldots\ldots\ldots C_S^{i,14}$ |
| ⋮ | ⋮ |
| 64 | |

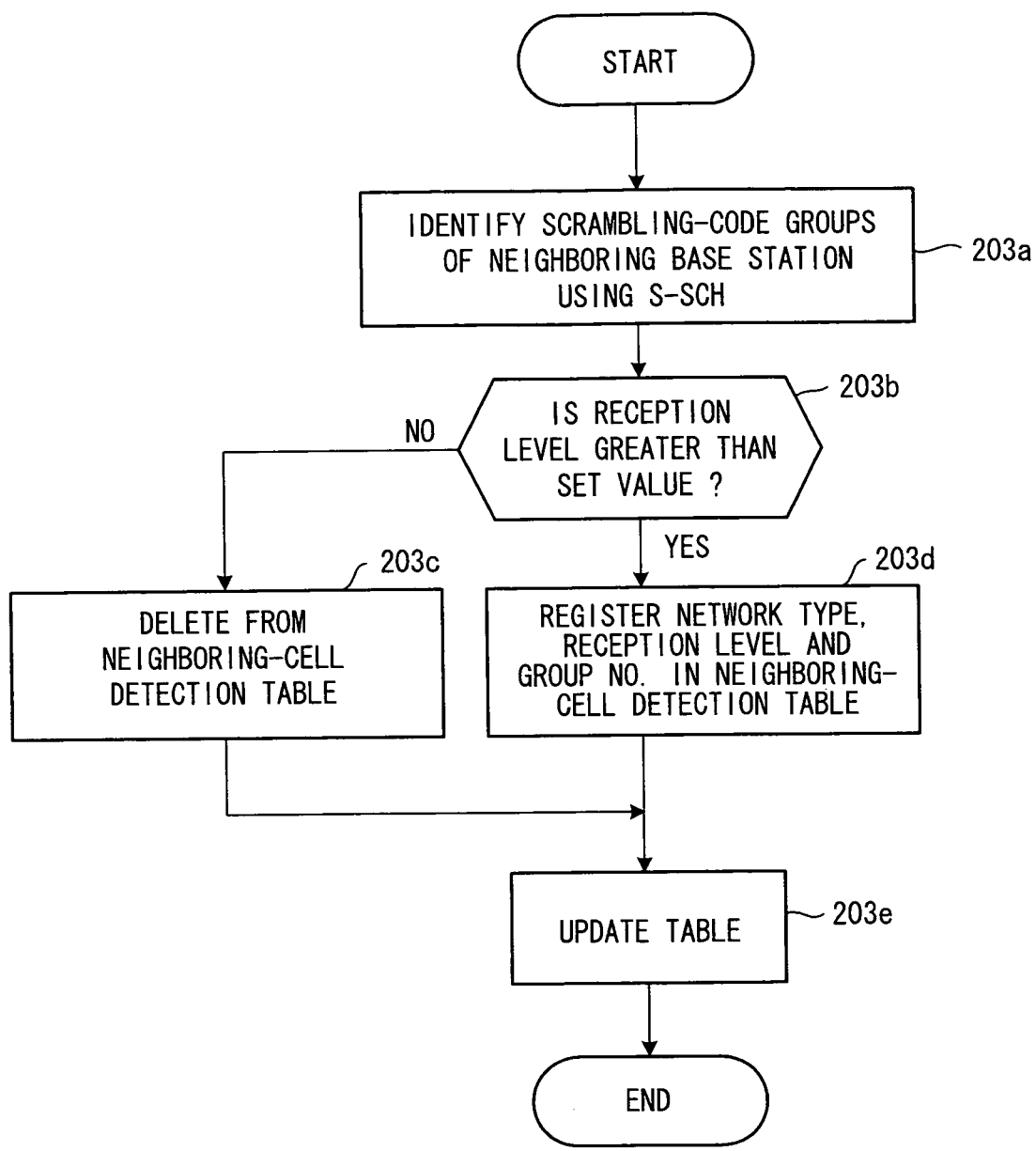

FIG. 10

| SCRAMBLING CODE GROUP | NETWORK TYPE |
|---|---|
| SCRAMBLING CODE GROUP 1 | FOR W-CDMA |
| SCRAMBLING CODE GROUP 2 | |
| SCRAMBLING CODE GROUP 3 | |
| SCRAMBLING CODE GROUP 4 | |
| ⋮ | |
| SCRAMBLING CODE GROUP 31 | |
| SCRAMBLING CODE GROUP 32 | |
| SCRAMBLING CODE GROUP 33 | FOR GSM/PDC REGISTRATION |
| SCRAMBLING CODE GROUP 34 | |
| SCRAMBLING CODE GROUP 35 | |
| SCRAMBLING CODE GROUP 36 | |
| ⋮ | |
| SCRAMBLING CODE GROUP 63 | |
| SCRAMBLING CODE GROUP 64 | |

FIG. 11

| SCRAMBLING CODE GROUP | DETECTION LEVEL | NETWORK TYPE |
|---|---|---|
| SCRAMBLING CODE GROUP 3 | -80dbm | WCDMA |
| SCRAMBLING CODE GROUP 27 | -73dbm | WCDMA |
| SCRAMBLING CODE GROUP 63 | -85dbm | GSM/PDC |

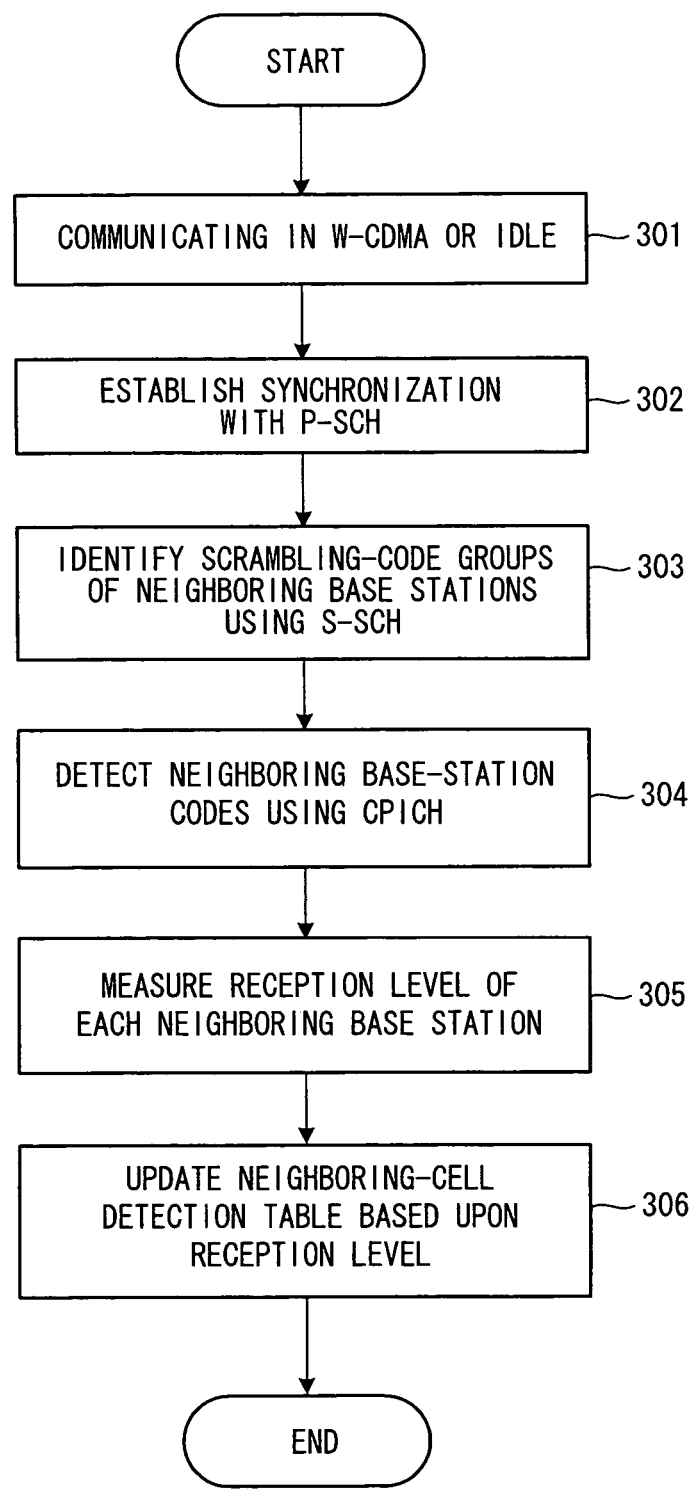

FIG. 13

| SCRAMBLING CODE | NETWORK TYPE |
|---|---|
| SCRAMBLING CODE 0 | |
| SCRAMBLING CODE 1 | |
| SCRAMBLING CODE 2 | FOR W-CDMA |
| SCRAMBLING CODE 3 | |
| ⋮ | |
| SCRAMBLING CODE .. | |
| SCRAMBLING CODE N | |
| SCRAMBLING CODE N+1 | |
| SCRAMBLING CODE .. | |
| SCRAMBLING CODE .. | FOR GSM/GPRS REGISTRATION |
| SCRAMBLING CODE .. | |
| ⋮ | |
| SCRAMBLING CODE 510 | |
| SCRAMBLING CODE 511 | |

FIG. 14

| DETECTION CODE | DETECTION LEVEL | NETWORK TYPE |
|---|---|---|
| SCRAMBLING CODE 1 | -80dbm | WCDMA |
| SCRAMBLING CODE 12 | -73dbm | WCDMA |
| SCRAMBLING CODE 389 | -85dbm | GSM/PDC |
| ⋮ | ⋮ | ⋮ |
| SCRAMBLING CODE 428 | -105dbm | GSM/PDC |

FIG. 19
(A)
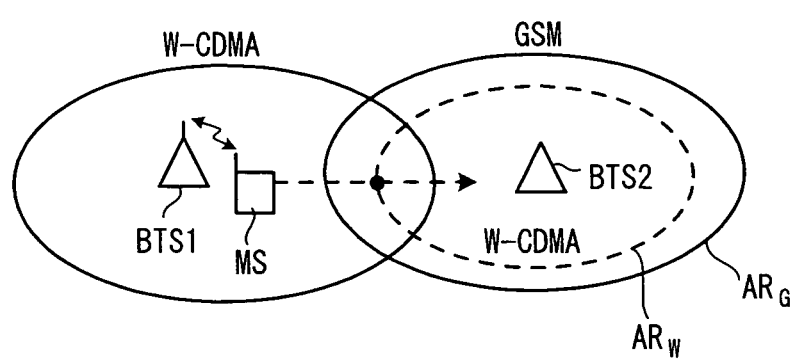
(B)
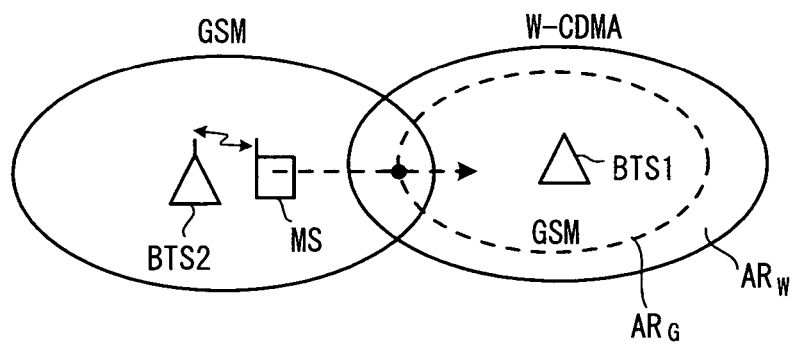

FIG. 24 PRIOR ART
(A)
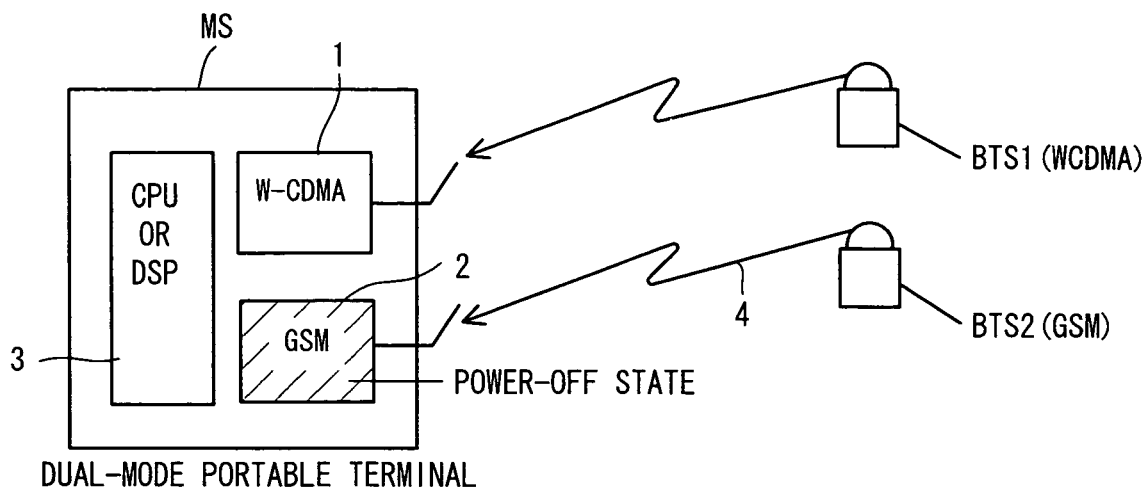
(B)
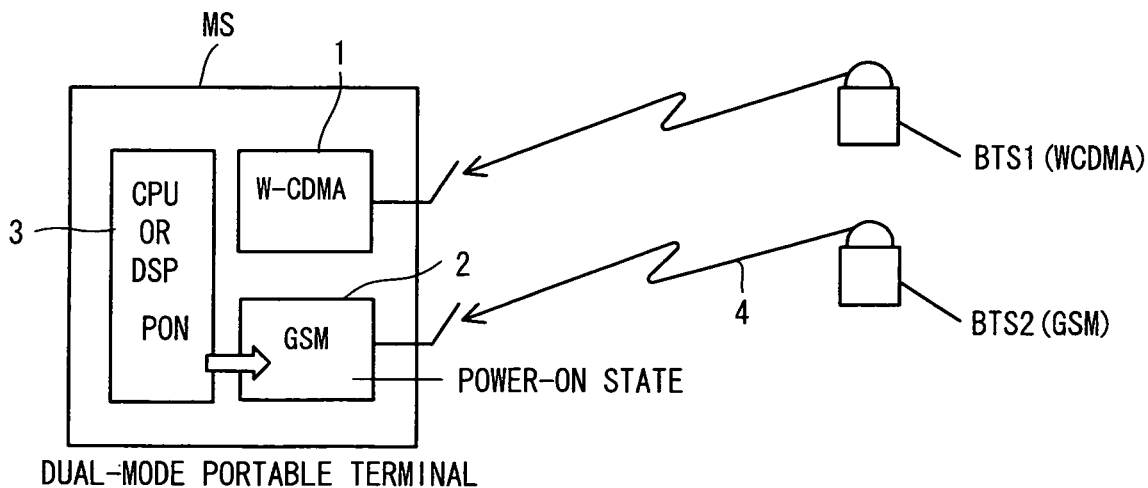

DUAL-MODE SYSTEM AND DUAL-MODE WIRELESS TERMINAL

CROSS-REFERENCE TO RELATED APPLICATION

This application is a continuation of International Application PCT/JP03/04368 filed on Apr. 7, 2003, now pending, the contents of which are herein wholly incorporated by reference.

BACKGROUND OF THE INVENTION

This invention relates to a dual-mode system and dual-mode wireless terminal in mobile communications. More particularly, the invention relates to a dual-mode wireless terminal that is capable of communicating in both a first mobile communication mode and a second mobile communication mode in a dual-mode environment, and to a dual-mode system for communicating using this terminal.

The present invention is used in a dual-mode environment in which a W-CDMA wireless system is made to coexist with the already existing wireless system GSM (Global System for Mobile Communication) or PDC (Personal Digital Cellular Telecommunication System) in Europe and Japan, etc.

In a dual-mode environment, a portable terminal uses either a W-CDMA or GSM (or PDC) wireless system (communication mode). In order to prepare for handover between base stations having different communication modes in such case, it is necessary for the terminal to ascertain whether there is a base station with both communication modes in the neighboring-cell. To achieve this, the terminal must periodically acquire information on base stations in the neighboring-cell even with regard to a communication mode that is not being used. At this time the terminal purposely starts up a communication unit conforming to a communication mode not in use and acquires information as to whether a base station in this unused communication mode exists in the neighboring-cell. The acquisition of information as to whether a base station in a communication mode currently being used is in the neighboring-cell is performed periodically.

FIG. 24 is a diagram for describing an example of operation according to the prior art. In a normal state shown at (A) of FIG. 24, a dual-mode terminal MS communicates with a W-CDMA base station BTS1 using a W-CDMA communication unit 1. The power supply of a GSM communication unit 2 is off at this time. However, GSM radio waves 4 are arriving from a GSM base station BTS2. Accordingly, a CPU (or DSP) 3 periodically issues a power-supply ON command PON to the GSM communication unit 2 and requests measurement of GSM radio waves (acquisition of neighboring-cell information), as indicated at (B) of FIG. 24). When neighboring-cell information is thus gathered, it is necessary to perform acquisition of neighboring-cell information that entails starting up a communication unit of a communication mode that is not in use and measuring the level of the radio waves.

In this mobile portable terminal MS, an important challenge concurrent with size reduction is how to extend continuous call operation and continuous standby time with a small battery. With the conventional method described above, the power supply of the communication unit of a communication mode not in use is turned on periodically and gathering of information concerning a neighboring base station of a communication not in use is performed periodically. That is, with the conventional method, it is necessary to periodically start up a communication unit of a communication mode other than the communication mode currently in use. Consequently, a commensurate amount of power is consumed, consumption of the terminal battery is hastened and continuous call time and standby time are shortened.

As an example of the prior art, there is a mobile telephone system (Patent Reference 1) in which when a mobile telephone system (PHS) currently in use leaves the service area, position registration in another mobile telephone system (GSM) is performed promptly. This involves retrieving and saving all control channels used by GSM immediately after the power supply of the terminal is turned on and executing position registration processing using a saved control channel when the terminal leaves the PHS area. Further, in a case where normal communication cannot be performed by any of the stored control channels, all control channels used by GSM are retrieved and saved. However, Patent Reference 1 does not relate to soft handover, in which communication is continued by changing over from a communicating base station to a base station of a different wireless system without instantaneous interruption. Further, Patent Reference 1 cannot search for a neighboring cell during travel in a dual-mode system in which handover is performed between base stations of different wireless systems. Patent Reference 1, therefore, does not solve the above-mentioned problems.

Patent Reference 1: Japanese Patent Application Laid-Open No. 11-298964

SUMMARY OF THE INVENTION

Accordingly, an object of the present invention is to so arrange it that whether base stations of mobile communication modes exist in the neighboring-cell can be recognized with little consumption of power in preparation for handover between base stations of different mobile communication modes in a dual-mode environment.

Another object of the present invention is to so arrange it that whether base stations of mobile communication modes exist in the neighboring-cell can be recognized by turning on the power supply only of the unit conforming to the mobile communication mode currently in operation and leaving the power supplies of units conforming to other mobile communication modes off.

The present invention is a dual-mode system for performing communication using a terminal equipped with first and second units capable of communicating in first and second mobile communication modes, respectively, in a dual-mode environment of a first mobile communication mode (e.g., W-CDMA) and a second mobile communication mode (e.g., GSM or PDC). A base station of the first mobile communication mode communicates with the terminal in the first mobile communication mode and transmits a radio signal in the second mobile communication mode, a base station of the second mobile communication mode communicates with the terminal in the second mobile communication mode and transmits a radio signal in the first mobile communication mode, the first unit of the terminal communicates with the base station of the first mobile communication mode in the first mobile communication mode, receives the radio signal of the first mobile communication mode transmitted from the base station of the second mobile communication mode and determines based upon this radio signal whether the base station of the second mobile communication mode exists, and the second unit of the terminal communicates with the base station of the second mobile communication mode in the second mobile communication mode, receives the radio signal of the second mobile communication mode transmitted from the base station of the first mobile communication mode and determines based upon this radio signal whether the base station of the first mobile communication mode exists.

That is, when the terminal is operating in the first mobile communication mode (W-CDMA), the base station of the second mobile communication mode (GSM/PDC) is transmitting a radio signal that can be recognized in the first mobile communication mode and therefore the terminal receives this radio signal and ascertains whether the base station of the second mobile communication mode exists. Further, when the terminal is operating in the second mobile communication mode (GSM/PDC), the base station (W-CDMA) of the first mobile communication mode is transmitting a radio signal that can be recognized in the second mobile communication mode and therefore the terminal receives this radio signal and ascertains whether the base station of the second mobile communication mode exists.

A second aspect of the present invention is a dual-mode wireless terminal capable of communicating in each of first and second mobile communication modes in a dual-mode environment of a first mobile communication mode and a second mobile communication mode. The dual-mode wireless terminal has first and second units for communicating in the first and second mobile communication modes, respectively, the first unit communicates with a base station of the first mobile communication mode in the first mobile communication mode, receives a radio signal of the first mobile communication mode transmitted from a base station of the second mobile communication mode and determines based upon this radio signal whether the base station of the second mobile communication mode exists, and the second unit communicates with the base station of the second mobile communication mode in the second mobile communication mode, receives the radio signal of the second mobile communication mode transmitted from the base station of the first mobile communication mode and determines based upon this radio signal whether the base station of the first mobile communication mode exists.

In accordance with above-described dual-mode system and dual-mode wireless terminal, whether base stations of mobile communication modes exist in the neighboring-cell can be recognized with little consumption of power in preparation for handover between base stations of different mobile communication modes.

Further, in accordance with the present invention, it is so arranged that whether base stations of mobile communication modes exist in the neighboring-cell can be recognized by turning on the power supply only of the unit conforming to the mobile communication mode currently in operation and leaving the power supplies of units conforming to other mobile communication modes off. As a result, consumption of power can be reduced and battery lifetime extended.

BRIEF DESCRIPTION OF THE DRAWINGS

FIG. 9 is a second processing flowchart for identifying whether a neighboring GSM base station exists by constantly sending P-SCH, S-SCH from the GSM base station;

FIG. 10 is a correspondence table between group numbers of scrambling codes and types of networks;

FIG. 11 illustrates an example of a neighboring-cell detection table;

FIG. 12 is a processing flowchart for identifying whether a neighboring GSM base station exists by constantly sending P-SCH, S-SCH and CPICH from the GSM base station;

FIG. 13 is a correspondence table between scrambling codes and types of networks;

FIG. 14 illustrates an example of a neighboring-cell detection table;

FIG. 19 shows an explanatory view [(A)] in which a dual-mode portable terminal MS performs handover owing to travel during communication with a W-CDMA base station BTS1, and an explanatory view [(B)] in which the dual-mode portable terminal MS performs handover owing to travel during communication with a GSM base station BTS2;

FIG. 24 is a diagram for describing an example of operation according to the prior art.

DESCRIPTION OF THE PREFERRED EMBODIMENTS (A) Overview of the Present Invention The present invention relates to a dual-mode system that uses a terminal capable of employing both a W-CDMA system and a GSM/PDC system in a dual-mode environment of W-CDMA and GSM/PDC, wherein the object is for each of the base stations to send radio signals for recognizing each other's system and for the terminal to acquire information concerning neighboring cells without starting up one system even if the terminal is using the other system. As a result, in accordance with the present invention, mutual cell information (information as to whether a base station exists) can be recognized without starting up both systems. This means that current is not consumed excessively by starting up the other system in order to acquire cell information, and it is possible to hand over to the necessary system when required.

Figure 1:
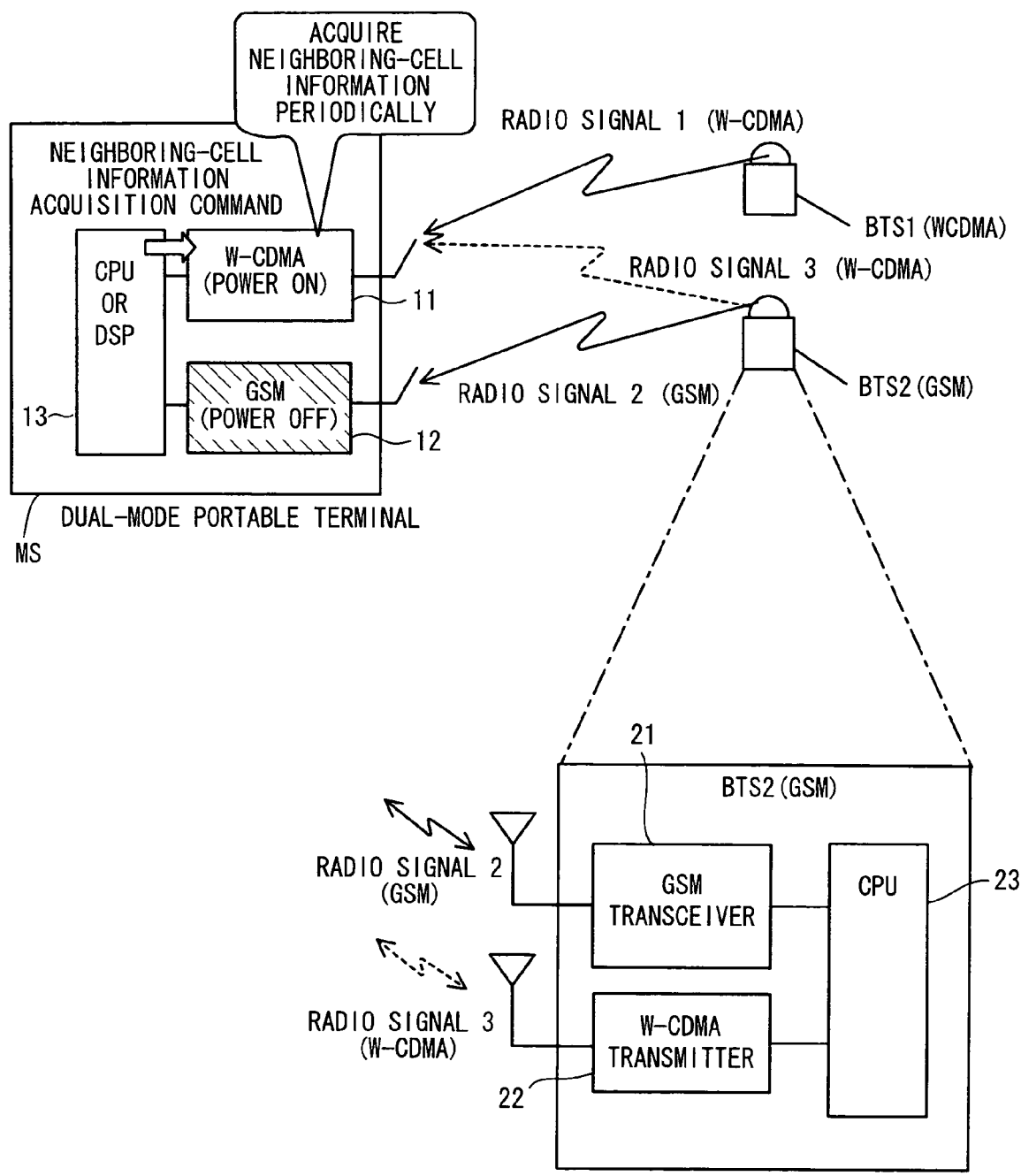
FIG. 1 is a diagram useful in describing a principle whereby a terminal MS recognizes the existence of a neighboring GSM base station while in communication with a W-CDMA base station.

FIG. 1 is a diagram useful in describing a principle whereby a W-CDMA unit 11 in a dual-mode portable terminal MS recognizes whether a GSM base station exists in the neighboring-cell while in communication with a W-CDMA base station BTS1. In FIG. 1, the W-CDMA base station BTS1 uses a radio signal 1 to provide service in W-CDMA. A GSM base station BTS2 uses a radio signal 2 to provide service in GSM but also transmits a radio signal 3 for W-CDMA in addition to the radio signal 2. That is, a GSM transceiver 21 of the GSM base station BTS2 uses the radio signal 2 to provide service in GSM under the control of a controller (CPU) 23, and a W-CDMA transmitter 22 transmits the radio signal 3 for W-CDMA. The radio signal 3 is a W-CDMA broadcast signal that is constantly being transmitted.

In this environment, the dual-mode portable terminal MS communicates with the W-CDMA base station BTS1 using the first unit (W-CDMA unit) 11 that is capable of communicating in W-CDMA. It should be noted that the power supply of second unit (GSM unit) 12, which is capable of communicating in GSM, is off. At this time the W-CDMA unit 11 is also executing processing (a cell search) for periodically searching for another base station BTS in accordance with a command from a controller (CPU or DSP) 13. If the GSM base station BTS2 is transmitting W-CDMA radio waves (the radio signal 3), the W-CDMA unit 11 of the terminal MS judges that the base station BTS exists and executes processing for specifying the base station BTS from the receive signal. Since a radio signal for W-CDMA intrinsically contains a code that identifies the base station BTS, the W-CDMA unit 11 compares this code with a previously registered BTS code for GSM, whereby the W-CDMA unit 11 can recognize the existence of the BTS for GSM. In other words, the existence of the BTS for GSM can be recognized with the power supply of the GSM unit 12 being left off.

Figure 2:
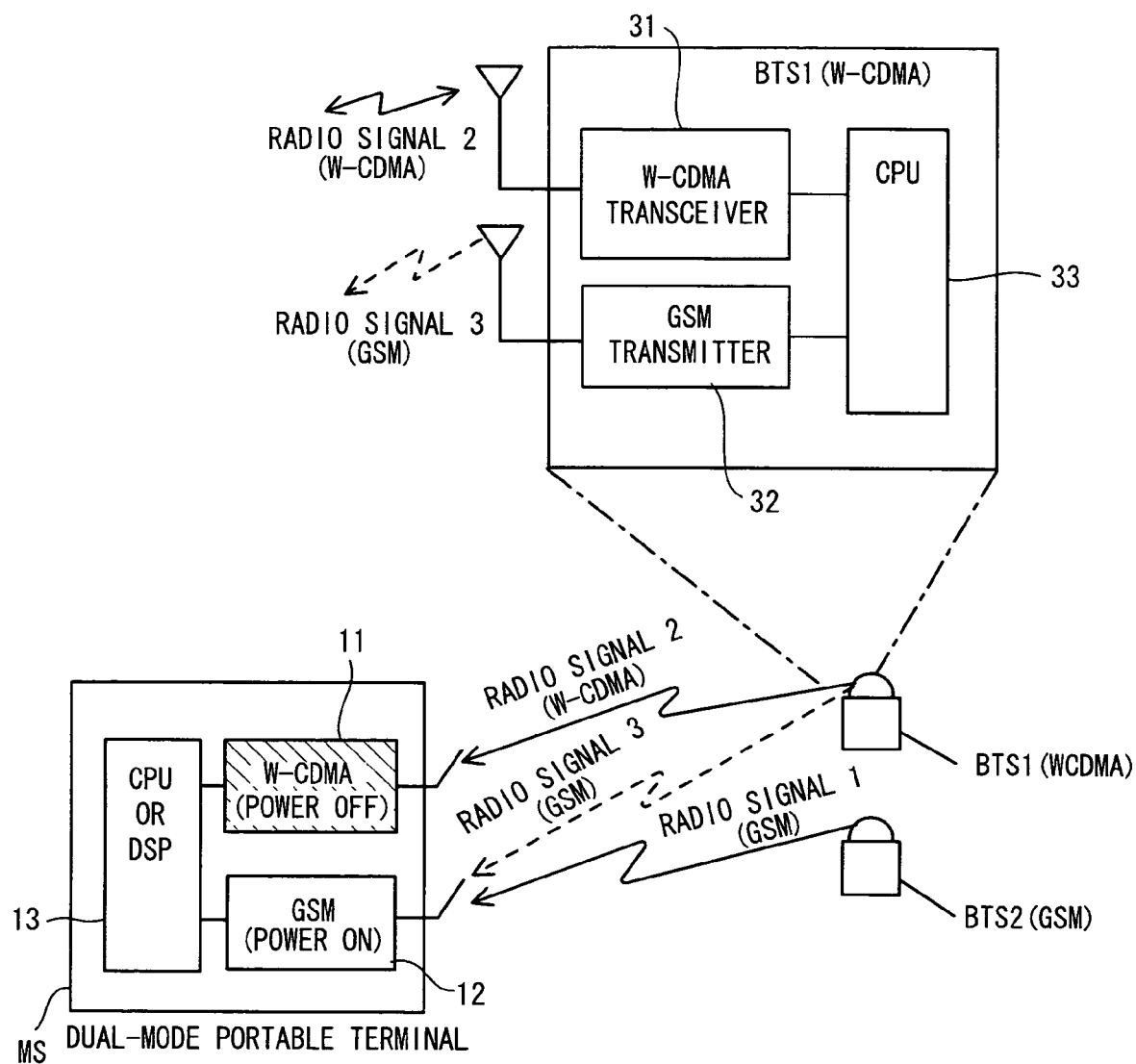
FIG. 2 is a diagram useful in describing a principle whereby a terminal MS recognizes the existence of a neighboring W-CDMA base station while in communication with a GSM base station.

FIG. 2 is a diagram useful in describing a principle whereby the GSM unit 12 in the dual-mode portable terminal MS recognizes the existence of a neighboring W-CDMA base station while in communication with the GSM base station BTS2. In FIG. 2, the GSM base station BTS2 provides service in GSM using the radio signal 1. The W-CDMA base station BTS1 uses the radio signal 2 to provide service in W-CDMA but also transmits the radio signal 3 for GSM in addition to the radio signal 2. That is, a W-CDMA transceiver 31 of the W-CDMA base station BTS1 uses the radio signal 2 to provide service in W-CDMA under the control of a controller (CPU) 33, and a GSM transmitter 32 transmits the radio signal 3 for GSM. The radio signal 3 is a GSM broadcast signal that is constantly being transmitted.

In this environment, the dual-mode portable terminal MS communicates with the GSM base station BTS2 using the GSM unit 12. It should be noted that the power supply of W-CDMA unit 11 is off. At this time the GSM unit 12 is also executing processing for periodically searching for another base station BTS in accordance with a command from the controller (CPU or DSP) 13. If the W-CDMA base station BTS1 is transmitting GSM radio waves (the radio signal 3), the GSM unit 12 of the terminal MS judges that the base station BTS exists and executes processing for specifying the base station BTS from the receive signal. Since a radio signal for W-CDMA intrinsically contains a synchronization pattern that identifies the base station BTS, the GSM unit 12 can recognize the existence of a base station BTS for W-CDMA by using a previously registered synchronization pattern of a BTS for W-CDMA. In other words, the existence of the BTS for W-CDMA can be recognized with the power supply of the W-CDMA unit 11 being left off.

(B) W-CDMA Signal Format

Figure 3:
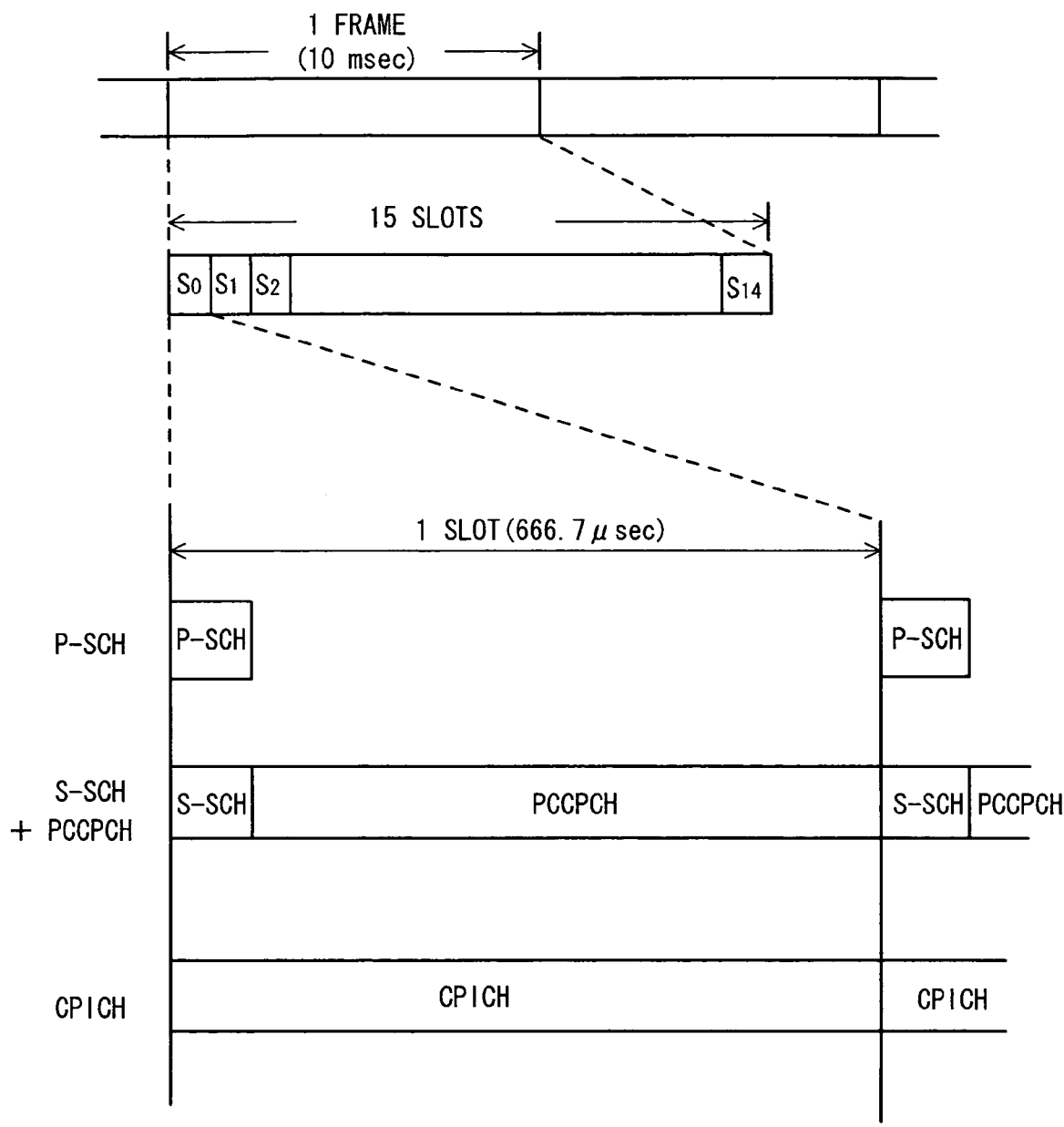
FIG. 3 is a diagram useful in describing the frame format of a downstream signal from a W-CDMA base station to a mobile station and a downstream channel relating to the present invention.

FIG. 3 is a diagram useful in describing the frame format of a downstream signal from a W-CDMA base station to a mobile station and a downstream channel relating to the present invention. One frame is 10 msec and is composed of 15 slots S0 to S14.

A primary synchronization channel P-SCH is used to achieve slot synchronization on a channel for cell search. The P-SCH is spread by a preset primary scrambling code PSC having a length of 256 chips and is deployed over the leading 66.7 μsec of every slot. The PSC is the same at all base stations.

A secondary synchronization channel S-SCH is a channel for establishing frame synchronization with respect to the base station and for allowing the mobile station to recognize in which scramble group the base station (cell) belongs. The S-SCH is spread by secondary scrambling code SSC having a length of 256 chips and is deployed over the leading 66.7 μsec of every slot. Further, 512 scrambling codes SC are prepared as base-station codes, and these are classified into 64 groups of eight codes each. In which group a base-station code belongs is identified, after which the base-station code can be identified by obtaining correlation between the receive signal and the eight scrambling codes that belong to the group.

Figures 4, 5:
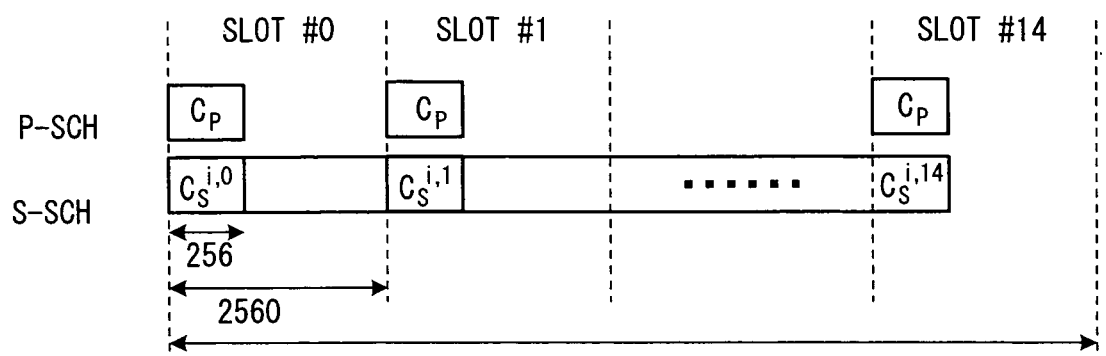
FIG. 4 is a diagram useful in describing P-SCH and S-SCH.
FIG. 5 is a diagram useful in describing a correspondence table between patterns $Cs^{i,0}$, $Cs^{i,1}$, $Cs^{i,2}$, ... $Cs^{i,14}$ of 15 secondary scrambling codes SSC and group numbers.

The correspondence between 15 SSC patterns $Cs^{i,0}$, $Cs^{i,1}$, $Cs^{i,2}$, ... $Cs^{i,14}$, which are inserted into the leading ends of 15 slots of one frame as shown in FIG. 4, and group numbers is established in advance, as illustrated in FIG. 5. Accordingly, a terminal can identify the group of a base-station code depending upon which code pattern is being transmitted by the base station.

In FIG. 2, a primary common control channel PCCPCH is a downstream common channel, one exists for each base station and it is used to transmit BCH (notification information). The BCH contains all information relating to the base station and also includes type information as to whether the base station is a W-CDMA base station or GSM base station.

A common pilot channel CPICH is a downstream common channel and one exists for each cell. The CPICH is spread by a base-station code. The terminal MS is capable of identifying the base-station code by calculating the correlation between each of the eight scrambling codes of the identified group and the common pilot channel CPICH.

Figure 6:
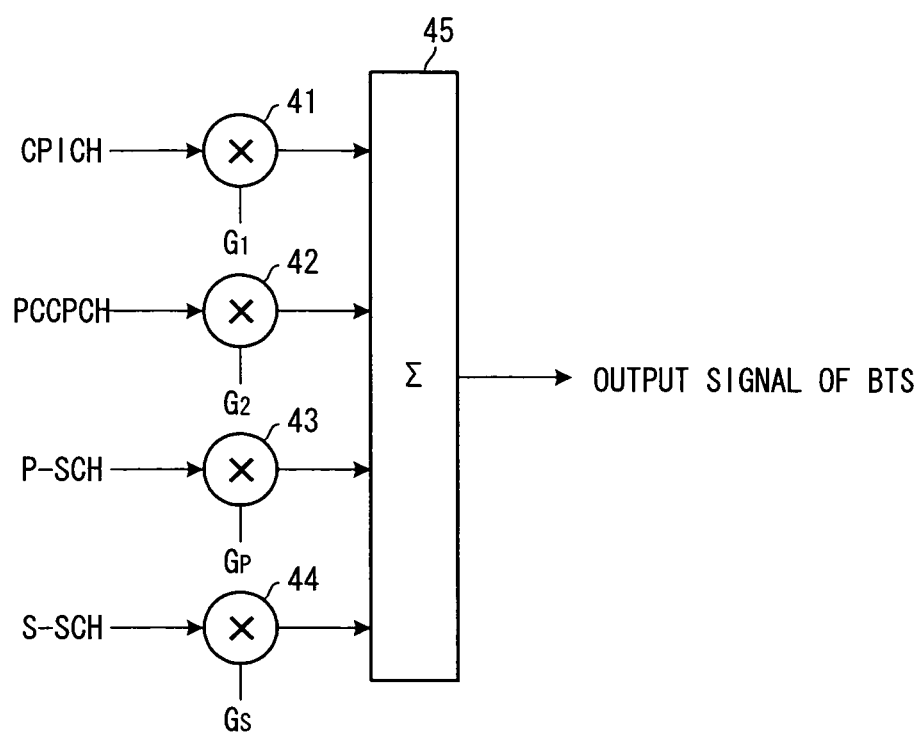
FIG. 6 is a diagram useful in describing a W-CDMA transmitter of a GSM base station BTS2.

The W-CDMA transceiver 31 (FIG. 2) of the W-CDMA base station BTS1 is fully equipped to execute W-CDMA communication. On the other hand, the W-CDMA transmitter 22 (FIG. 1) of the GSM base station BTS2 spreads the channels by prescribed code using multipliers 41 to 44, as shown in FIG. 6, combines the results of spreading by a combiner 45 and transmits the combined signal via a radio transmitter, which is not shown.

Figure 7:
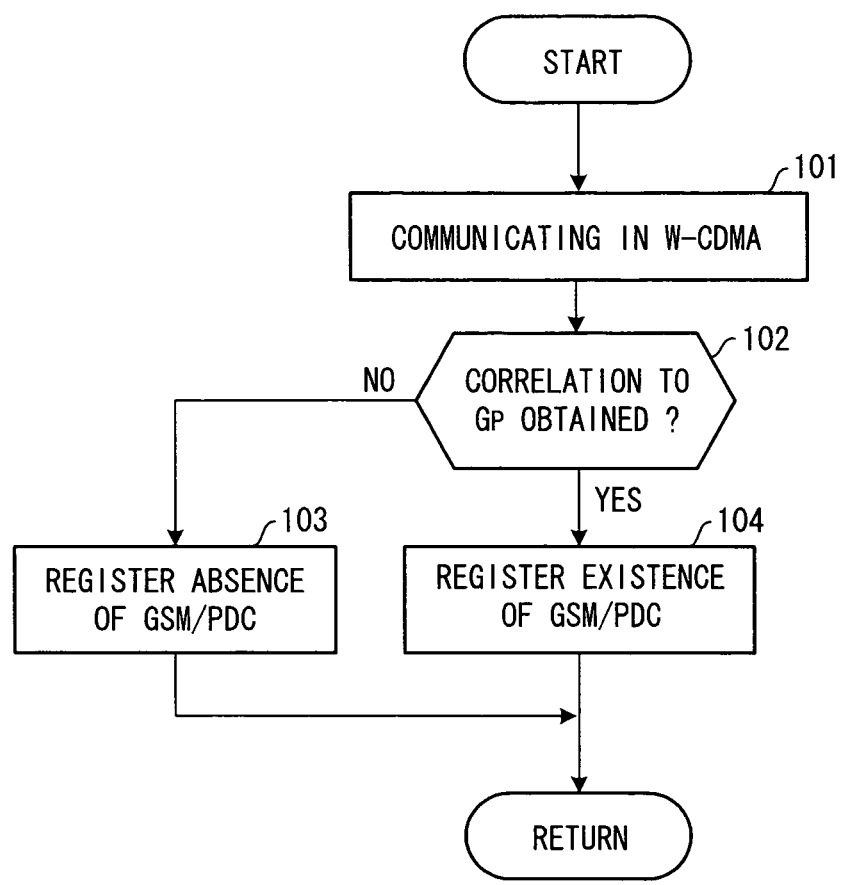
FIG. 7 is a processing flowchart for identifying whether a neighboring GSM base station exists by constantly sending P-SCH from a GSM base station.

(C) Processing for Identifying Whether Neighboring GSM Base Station Exists (a) When P-SCH is Transmitted from GSM Base Station FIG. 7 is a processing flowchart for identifying whether a neighboring GSM base station exists by constantly sending a P-SCH of W-CDMA from a GSM base station. It should be noted that the primary scrambling code PSC by which the W-CDMA base station spreads the P-SCH and the secondary scrambling code PSC by which the GSM base station spreads the P-SCH differ. Let the PSC of the GSM base station be Gp.

In the W-CDMA mode, the mobile station (dual-mode portable terminal) MS is in communication with the W-CDMA base station BTS1 (see FIG. 1), the power supply of the W-CDMA unit 11 is on and the power supply of the GSM unit 12 is off (step 101).

The W-CDMA unit 11 conducts a search of neighboring base stations periodically, calculates the correlation between the code Gp and the receive signal and determines whether correlation has been obtained (whether slot synchronization has been achieved) (step 102). If correlation has not been obtained, the W-CDMA unit 11 judges that no GSM base station exists (step 103). If correlation has been obtained, then the W-CDMA unit 11 judges that a GSM base station exists (step 104) and control returns to start.

It should be noted that it can also be so arranged that the W-CDMA unit 11 measures the reception level and judges that a GSM base station exists at step 104 only if the reception level is greater than a set value.

(b) When P-SCH, S-SCH are Transmitted from GSM Base Station

Figure 8:
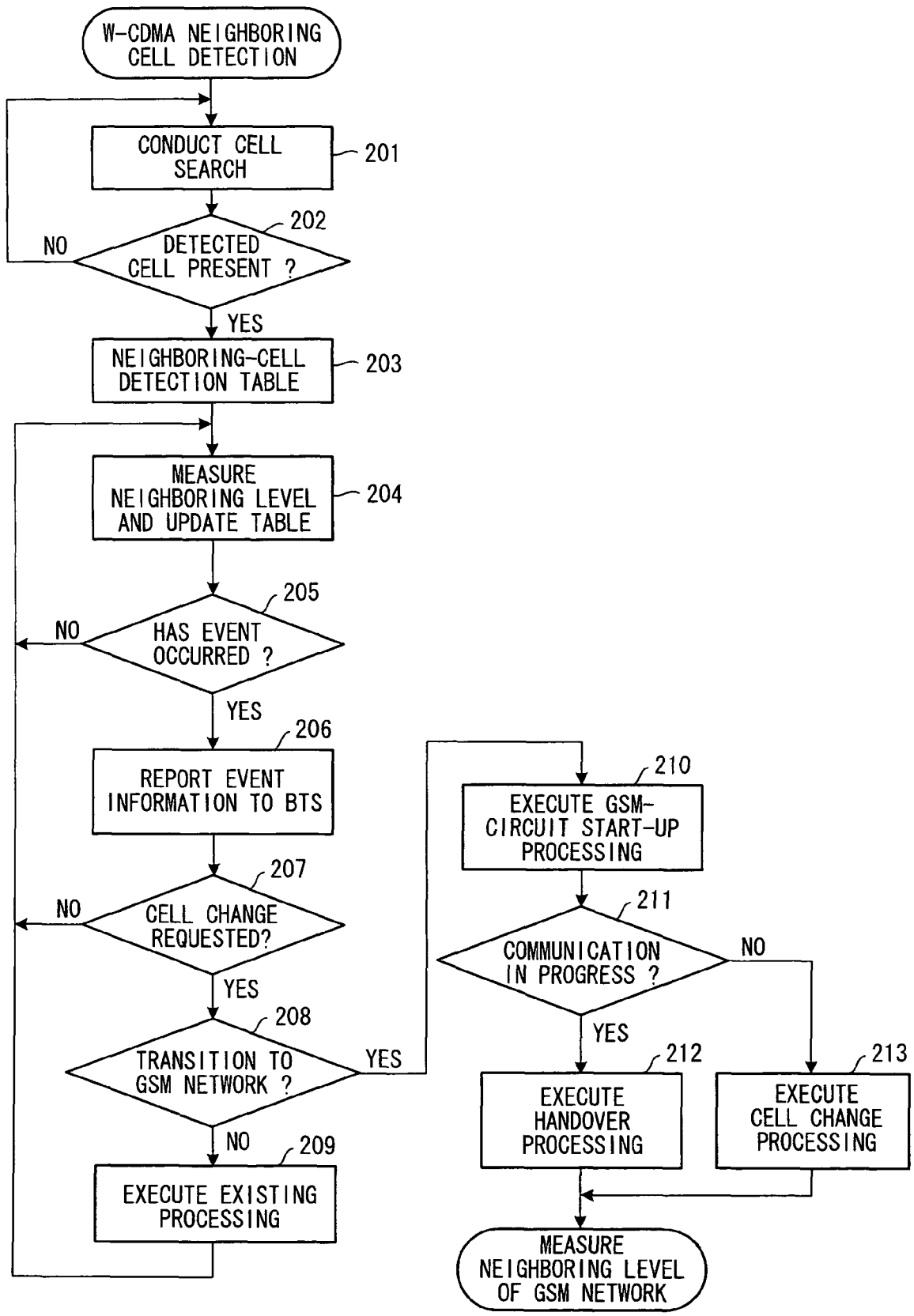
FIG. 8 is a first processing flowchart for identifying whether a neighboring GSM base station exists by constantly sending P-SCH, S-SCH from the GSM base station.

FIGS. 8 and 9 are processing flowcharts for identifying whether a neighboring GSM base station exists by constantly sending a P-SCH and S-SCH of W-CDMA from a GSM base station. It should be noted that the spreading code (PSC) of P-SCH transmitted by the GSM base station is the same as the spreading code (PSC) of P-SCH transmitted by the W-CDMA base station. Further, the group numbers of the scrambling codes used by the W-CDMA base station and the group numbers of the scrambling codes used by the GSM base station are classified as shown in FIG. 10. The W-CDMA unit 11 holds this table. That is, it is assumed that group numbers 1-32 are scrambling-code groups used by the W-CDMA base station and that group numbers 33-64 are scrambling-code groups used by the GSM base station.

The dual-mode portable terminal (mobile station) MS is in communication with the W-CDMA base station BTS1 (see FIG. 1), the power supply of the W-CDMA unit 11 is on and the power supply of the GSM unit 12 is off. Under these conditions, the W-CDMA unit 11 conducts a search of neighboring base stations periodically in accordance with a command from the controller 13 (step 201), calculates the correlation between the known primary scrambling code PSC and the receive signal and determines whether correlation has been obtained (whether slot synchronization has been achieved) (step 202). If correlation has not been obtained, the W-CDMA unit 11 continues with the cell search.

If correlation is obtained, then the W-CDMA unit 11 construes that there is a cell present and updates the neighboring-cell detection table (step 203). Specifically, as shown in FIG. 9, the W-CDMA unit 11 identifies the scrambling-code groups of the neighboring base station using S-SCH (step 203a). The W-CDMA unit 11 then detects the reception level with regard to each identified scrambling-code group, determines whether the reception level is greater than or less than a set level (step 203b), decides on deletion if the reception level is less (step 203c) and decides on registration of the group number, reception level and network type, etc., if the reception level is greater (203d). If the above-described processing ends with regard to all scrambling-code groups identified at step 203a, then the W-CDMA unit 11 updates the neighboring-cell detection table based upon the decisions rendered at steps 203c, 203d (step 203e). FIG. 11 is an example of the neighboring-cell detection table. Three base stations exist in the neighboring-cell at present, and the group number, detection level (reception level) and network type (whether the base station is a W-CDMA base station or GSM base station) are recorded for each base station.

A case where the terminal is communicating has been described above. In a case where power has been introduced, however, operation is as follows: Immediately after power is introduced, the terminal MS conducts a cell search to create the neighboring-cell detection table and subsequently executes position registration and undergoes a transition to an idle state (standby state).

The terminal MS measures the reception level of the neighboring base station in the standby state and during communication and updates the neighboring-cell detection table (step 204). The terminal MS checks to determine whether there has been a decline of the reception level from the communicating base station or a rise in the reception level from a neighboring base station (occurrence of an event) (step 205). If occurrence of an event is detected, the communicating base station BTS is notified of the event (step 206). An event occurs in a case where the level being detected by the terminal MS exceeds a threshold value based upon threshold-value information of the level of which is notified by BCCH during standby and by DCCH during communication from the base station BTS.

If there is a request from the base station BTS to change the standby cell or communicating cell (step 207), the terminal MS effects a transition to the cell, which has been designated by the base station BTS, under the control of the controller 13. At the time of the transition, the controller 13 determines whether the cell that is the destination of the transition is a cell in a W-CDMA network or in a GSM network (step 208). In the case of a W-CDMA network, the existing cell is updated or handover is carried out (step 209). If the cell that is the destination of the transition is a cell in a GSM network, on the other hand, then the controller 13 starts up the GSM unit 12 (step 210) and determines whether the terminal MS is communicating (step 211). The controller executes handover processing (step 212) for handover to the GSM base station if the terminal MS is communicating and executes processing to change the cell (step 213) if the terminal MS is not communicating.

(c) When P-SCH, S-SCH, CPICH are Transmitted from GSM Base Station

FIG. 12 is a processing flowchart for identifying whether a neighboring GSM base station exists by constantly sending P-SCH, S-SCH and CPICH of W-CDMA from a GSM base station.

It should be noted that the spreading code (PSC) of P-SCH transmitted by the GSM base station is the same as the spreading code (PSC) of P-SCH transmitted by the W-CDMA base station. Further, the scrambling codes used by the W-CDMA base station and the scrambling codes used by the GSM base station are classified as shown in FIG. 13. The W-CDMA unit 11 holds this table. That is, it is assumed that scrambling codes 0-n are scrambling codes used by the W-CDMA base station and that scrambling codes (n+1)-511 are scrambling codes used by the GSM base station.

The dual-mode portable terminal MS is communicating with the W-CDMA base station BTS1 in the W-CDMA mode or is idle (step 301). The power supply of the W-CDMA unit 11 is on and the power supply of the GSM unit 12 is off. Under these conditions, the W-CDMA unit 11 is conducting a search of neighboring base stations (detecting establishment of slot synchronization) periodically using the known primary scramble code PSC in accordance with a command from the controller 13 (step 302). If establishment of slot synchronization is detected, the W-CDMA unit 11 identifies the scrambling-code groups of neighboring base stations using S-SCH (step 303). Next, the W-CDMA unit 11 detects scrambling codes of neighboring base stations (base-station codes) using CPICH (step 304).

The W-CDMA unit 11 subsequently measures the reception level with regard to each detected scrambling code, determines whether the reception level is greater than or less than a set level, decides on deletion if the reception level is less, decides on registration of the scrambling code, reception level and network type, etc., if the reception level is greater, and updates the neighboring-cell detection table based upon the decisions rendered (step 306). FIG. 14 is an example of the neighboring-cell detection table. A number of base stations exist in the neighboring-cell at present, and the scrambling, detection level (reception level) and network type are recorded for each base station.

Processing similar to that from step 204 onward in FIG. 8 is subsequently executed. That is, the updating of the neighboring-cell detection table, handover and cell change processing are executed by each of the steps from step 204 onward.

(d) When P-SCH, S-SCH, CPICH, BCH are Transmitted from GSM Base Station

Figure 15:
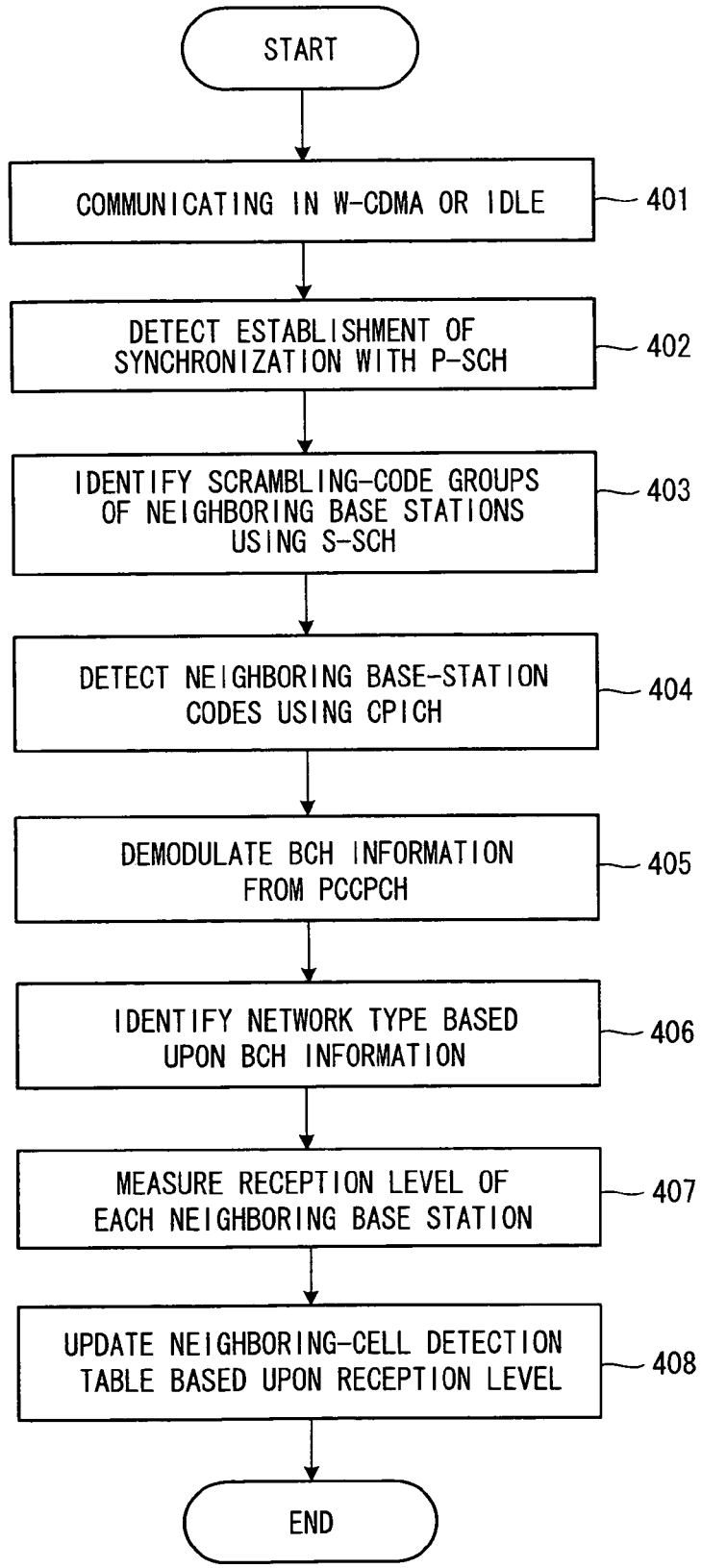
FIG. 15 is a processing flowchart for identifying whether a neighboring GSM base station exists by constantly sending P-SCH, S-SC, CPICH and BCH from the GSM base station.

FIG. 15 is a processing flowchart for identifying whether a neighboring GSM base station exists by constantly sending P-SCH, S-SCH, CPICH and BCH of W-CDMA from a GSM base station. It should be noted that the spreading code (PSC) of P-SCH transmitted by the GSM base station is the same as the spreading code (PSC) of P-SCH transmitted by the W-CDMA base station. Further, one base-station code has been assigned to the GSM base station.

The dual-mode portable terminal MS is communicating with the W-CDMA base station BTS1 or is idle in the W-CDMA mode (step 401), as shown in FIG. 1. The power supply of the W-CDMA unit 11 is on and the power supply of the GSM unit 12 is off. Under these conditions, the W-CDMA unit 11 is conducting a search of neighboring base stations periodically using the known primary scramble code PSC in accordance with a command from the controller 13 (step 402). If establishment of slot synchronization is detected, the W-CDMA unit 11 identifies the scrambling-code groups of neighboring base stations using S-SCH (step 403). Next, the W-CDMA unit 11 detects scrambling codes of neighboring base stations (base-station codes) using CPICH (step 404).

If a base-station code is found, P-CCPCH is despread to demodulate the BCH information (step 405) and the network type of the base station is identified based upon this BCH information (step 406). Further, the W-CDMA unit 11 subsequently measures the reception level with regard to each scrambling code identified (step 407), determines whether the reception level is greater than or less than a set level, decides on deletion if the reception level is less, decides on registration of the scrambling code, reception level and network type, etc., if the reception level is greater, and updates the neighboring-cell detection table based upon the decisions rendered (step 408).

Processing similar to that from step 204 onward in FIG. 8 is subsequently executed. That is, the updating of the neighboring-cell detection table, handover and cell change processing are executed by each of the steps from step 204 onward.

(e) When SCH and FCCH of GSM are Transmitted from W-CDMA Base Station

Figure 16:
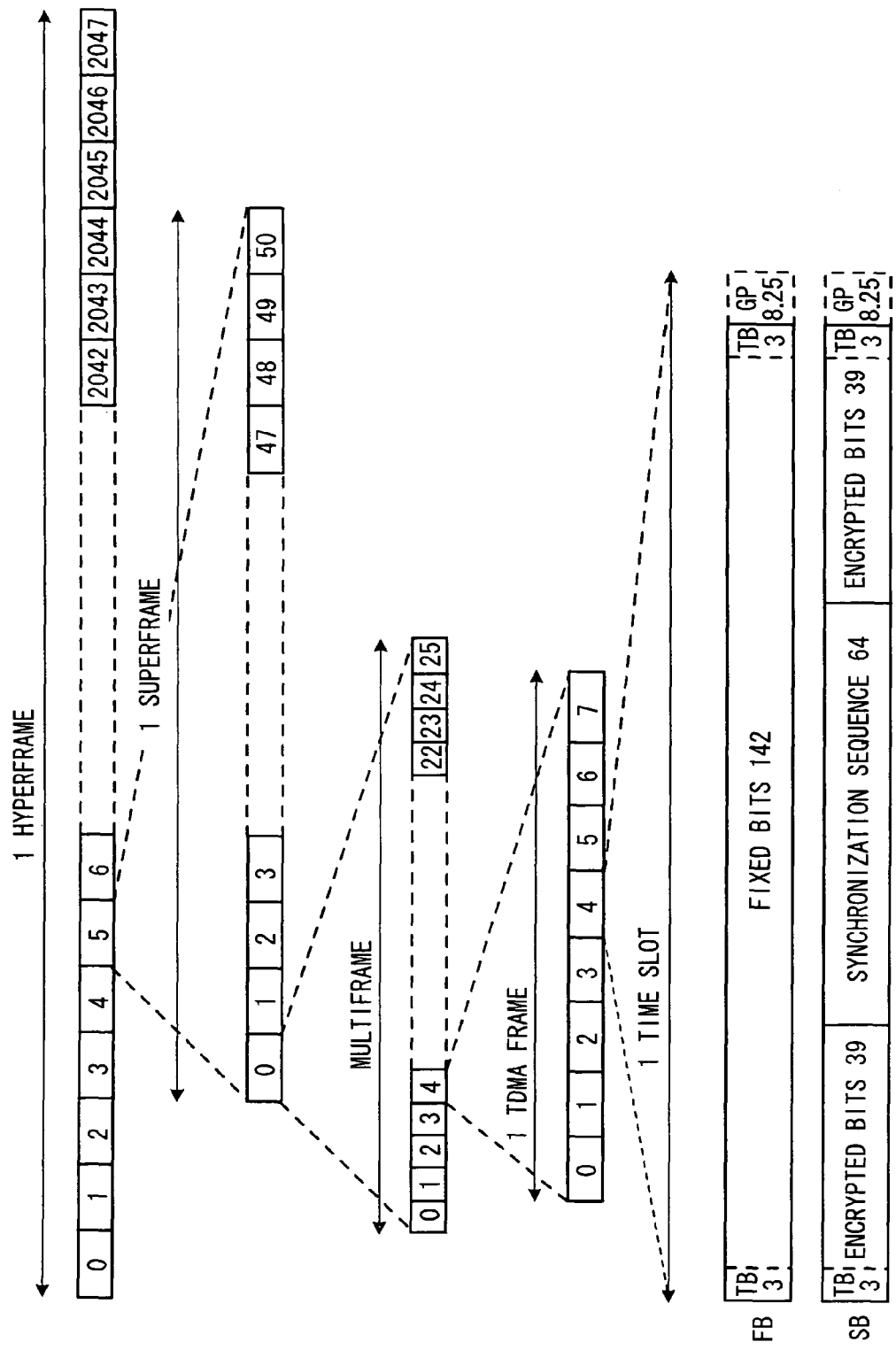
FIG. 16 is a downstream-signal format of a GSM signal of a prescribed frequency.

FIG. 16 is a downstream-signal format of a GSM signal of a prescribed frequency. A hyperframe HF is composed of 2048 superframes SF, one superframe SF is composed of, e.g., 26 multiframes MF, one multiframe MF is composed of a TDMA frame of eight slots, and one TDMA frame consists of 148 bits, in which a tail bits TB are provided at both ends and a guard interval GP is provided. In GSM, a 148-bit synchronization burst SB is inserted every ten frames. This synchronization burst is referred to as an SCH (synchronization channel). The timing of each frame can be ascertained accurately by establishing synchronization of the SCH. Similarly, a 148-bit frequency correction burst FB is inserted every ten frames. This frequency correction burst FB is referred to as an FCCH (frequency correction channel). A clock signal having an accurate frequency can be generated by using FCCH. The notification channel BCCH and common control channel CCCH, etc., are transported by the multiframe MF.

A prescribed frequency F1 and a prescribed SB pattern and FB pattern are assigned to the W-CDMA base station BTS1 (FIG. 2). The W-CDMA base station BTS1 constantly transmits a GSM signal of the above-mentioned frequency F1 in which the SB pattern and FB pattern have been inserted every ten frames. The dual-mode portable terminal MS corrects the frequency to F1 using the FB pattern and determines whether a W-CDMA base station exists based upon whether or not synchronization has been established by the SB pattern.

Figure 17:
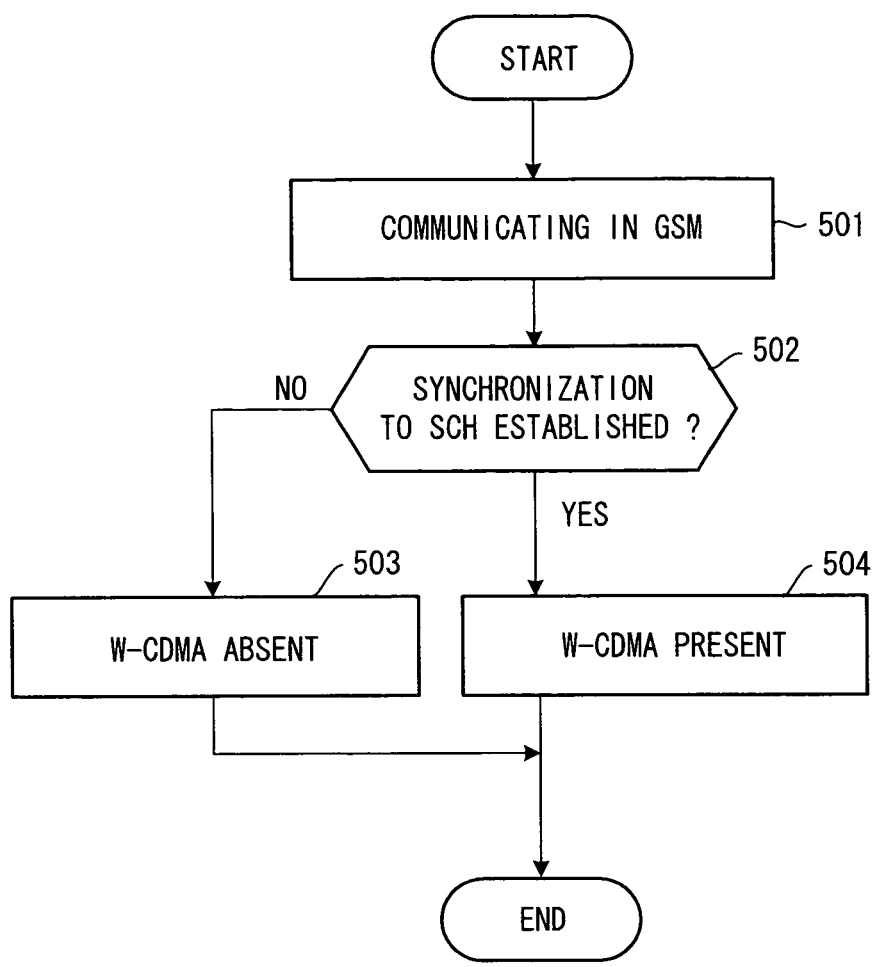
FIG. 17 is a processing flowchart for identifying whether a neighboring GSB base station exists by constantly sending SCH of a prescribed synchronization burst SB and FCCH of a prescribed frequency correction burst FG at a prescribed frequency from a W-CDMA base station.

FIG. 17 is a processing flowchart for identifying whether a neighboring GSB base station exists by constantly sending SCH, FCCH from the W-CDMA base station at the prescribed frequency F1. It is assumed that the dual-mode portable terminal MS knows the frequency F1, the pattern of the synchronization burst SB and the pattern of the frequency correction burst FB.

The dual-mode portable terminal MS (see FIG. 2) is communicating with the GSM base station BTS2 in the GSM mode, the power supply of the GSM unit 12 is on and the power supply of the W-CDMA unit 11 is off (step 501).

The GSM unit 12 is conducting a search of neighboring base stations periodically using the known frequency F1, synchronization burst pattern and frequency correction burst pattern in accordance with a command from the controller 13, corrects the frequency of the clock signal to F1 by FCCH and monitors whether establishment of synchronization using SCH (step 502).

If synchronization to SCH is not established, it is judged that a W-CDMA base station does not exist (step 503). If synchronization to SCH is established, it is judged that a W-CDMA base station does exist (step 504). Control then returns to start and processing from this point onward is repeated.

It should be noted that it can also be so arranged that the GSM unit 12 measures the reception level and judges that a W-CDMA base station exists at step 504 only if the reception level is greater than a set value. Further, it is also possible to adopt an arrangement in which a W-CDMA base station is identified by changing the combination of the SB pattern and frequency assigned to the W-CDMA base station.

(f) When SCH, FCCH and BCCH are Transmitted from W-CDMA Base Station

Figure 18:
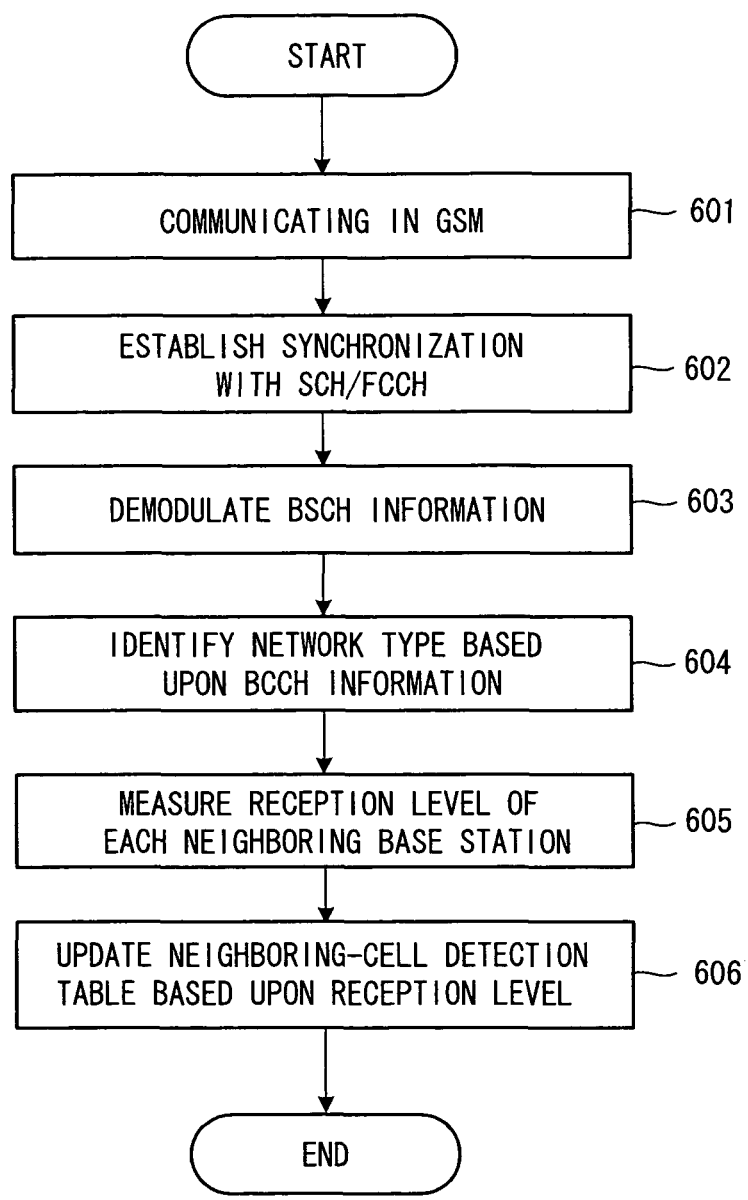
FIG. 18 is a processing flowchart for identifying whether a neighboring GSM base station exists by sending SCH, FCCH and BCCH from a W-CDMA base station.

FIG. 18 is a processing flowchart for identifying whether a neighboring GSB base station exists by constantly sending SCH, FCCH and BCCH from the W-CDMA base station. The prescribed frequency F1, synchronization burst pattern and frequency correction burst pattern have been assigned to the W-CDMA base station BTS1 (FIG. 2). The W-CDMA base station BTS1 periodically transmits a GSM signal of the frequency F1 in which the SB pattern and FB pattern have been inserted every ten frames and the type information of the W-CDMA base station has been incorporated in the BCCH.

The dual-mode portable terminal MS (FIG. 2) is communicating with the GSM base station BTS2 in the GSM mode, the power supply of the GSM unit 12 is on and the power supply of the W-CDMA unit 11 is off (step 601).

The GSM unit 12 is conducting a search of neighboring base stations periodically using the known frequency F1, synchronization burst pattern and frequency correction burst pattern in accordance with a command from the controller 13, corrects the frequency of the clock signal to F1 using FCCH and effects synchronization to the synchronization burst pattern of SCH (step 602). After synchronization is established, the GSM unit 12 demodulates BCCH (step 603) and identifies the fact that a W-CDMA base station exists in the neighboring-cell based upon the network-type information contained in the BCCH information (step 604).

Next, the GSM unit 12 measures the reception level from the W-CDMA base station (step 605), determines whether the reception level is greater than or less than a set level, decides that a W-CDMA base station does not exist if the reception level is less and decides that a W-CDMA base station exists if the reception level is greater (step 606). It should be noted that detailed information specifying the W-CDMA base station can be incorporated in the BCCH information.

The above-described operation is subsequently repeated to create a neighboring-cell detection table, and handover and cell change are carried out by processing similar to that of FIG. 8.

(D) Area Reached by Second Radio Signal Transmitted by Base Station of First Wireless Mode FIG. 19(A) is an explanatory view in which the dual-mode portable terminal MS performs handover owing to travel during communication with the W-CDMA base station BTS1. In this case, it is required that an area $AR_W$, in which a W-CDMA radio signal transmitted by the neighboring GSM base station BTS2 arrives, be made smaller than or equal to an area $AR_G$ in which GSM radio signals arrive. If the areas are thus set, a point at which the destination of communication is changed over from the W-CDMA base station BTS1 to the GSM base station BTS2 owing to movement by the dual-mode portable terminal MS while the terminal communicates with the W-CDMA base station BTS1 will be on the inner side of the area $AR_W$. In other words, this point will be within a region in which GSM radio waves arrive reliably, and communication will not be interrupted. However, if the area $AR_W$ in which W-CDMA radio waves arrive is larger than the area $AR_G$ in which GSM radio waves arrive, then the point at which the destination of communication is changed over from the W-CDMA base station BTS1 to the GSM base station BTS2 will be a region in which GSM radio waves do not arrive and communication will be interrupted.

FIG. 19(B) is an explanatory view in which the dual-mode portable terminal MS performs handover owing to travel during communication with the GSM base station BTS2. In this case, it is required that an area $AR_G$, in which a GSM radio signal transmitted by the neighboring W-CDMA base station BTS1 arrives, be made smaller than or equal to an area $AR_W$ in which W-CDMA radio signals arrive. If the areas are thus set, a point at which the destination of communication is changed over from the GSM base station BTS2 to the W-CDMA base station BTS1 owing to movement of the dual-mode portable terminal MS while the terminal communicates with the GSM base station BTS2 will be on the inner side of the area $AR_G$. In other words, this point will be within a region in which W-CDMA radio waves arrive reliably, and communication will not be interrupted. However, if the area $AR_G$ in which GSM radio waves arrive is larger than the area $AR_W$ in which W-CDMA radio waves arrive, then the point at which the destination of communication is changed over from the GSM base station BTS2 to the W-CDMA base station BTS1 will be a region in which GSM radio waves do not arrive and communication will be interrupted.

(E) Timing at Which Base Station of First Wireless Mode Starts Transmitting Second Radio Signal In the embodiment thus far, the case described is one in which the base station of the first wireless mode transmits the second radio signal constantly. That is, this is a case where the GSM base station BTS2 transmits the W-CDMA radio signal constantly and the W-CDMA base station BTS1 transmits the GSM radio signal constantly. However, since the signals are transmitted constantly, a problem which arises is large power consumption by the base stations.

Figure 20:
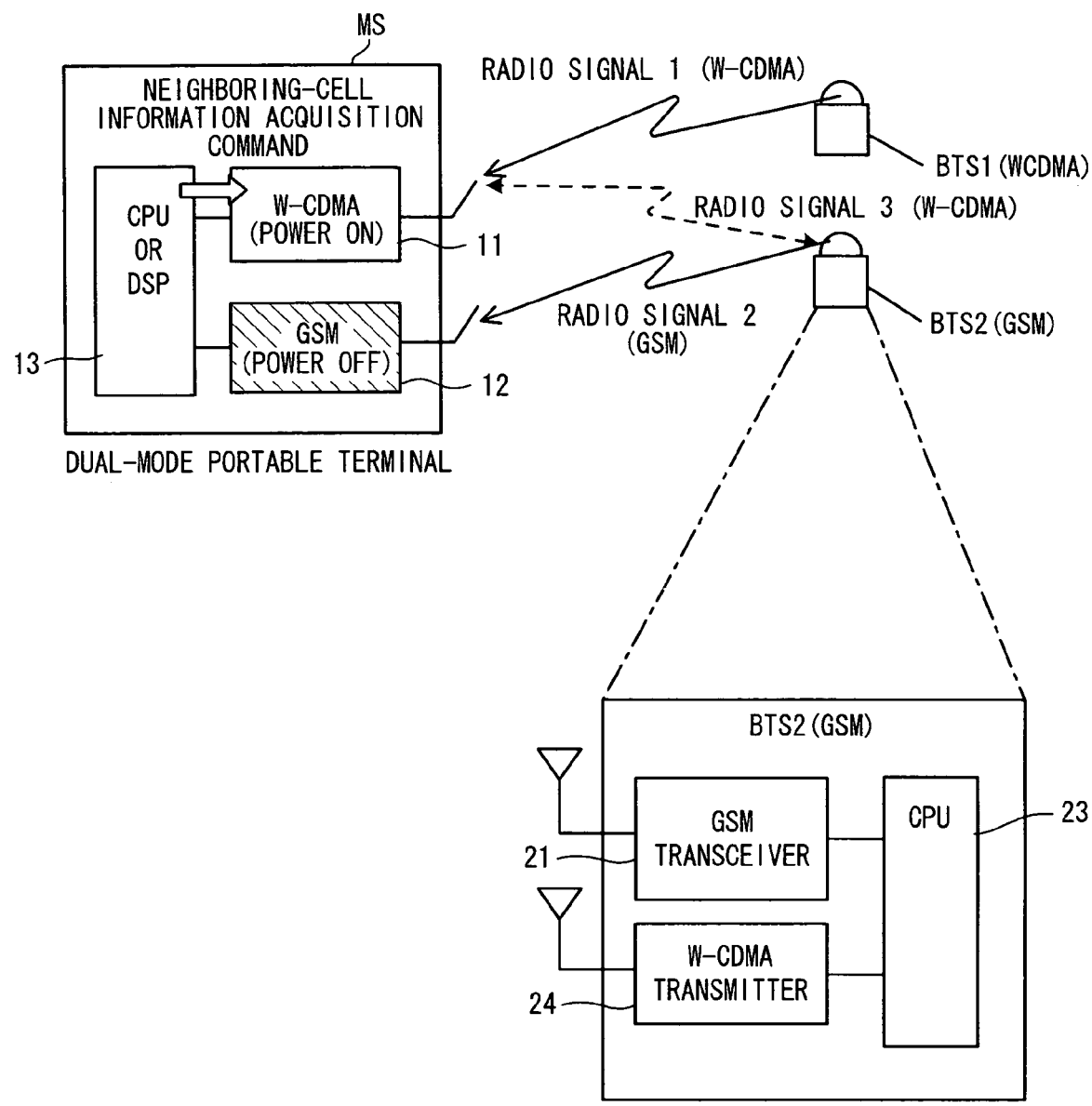
FIG. 20 is an explanatory view of a case where transmission of a W-CDMA radio signal is started when a GSM base station receives a W-CDMA radio signal from a dual-mode portable terminal MS.

Accordingly, as shown in FIG. 20, the GSM base station BTS2 is equipped with a receiver (W-CDMA transceiver) 24 in addition to a W-CDMA transmitter. When the W-CDMA radio signal 3 from the dual-mode portable terminal MS is received, the GSM base station BTS2 starts transmitting the W-CDMA radio signal; when the W-CDMA radio signal 3 stops being received, the GSM base station BTS2 stops transmitting the W-CDMA radio signal. It should be noted that FIG. 20 corresponds to FIG. 1 and that the same components are designated by like reference characters.

Figure 21:
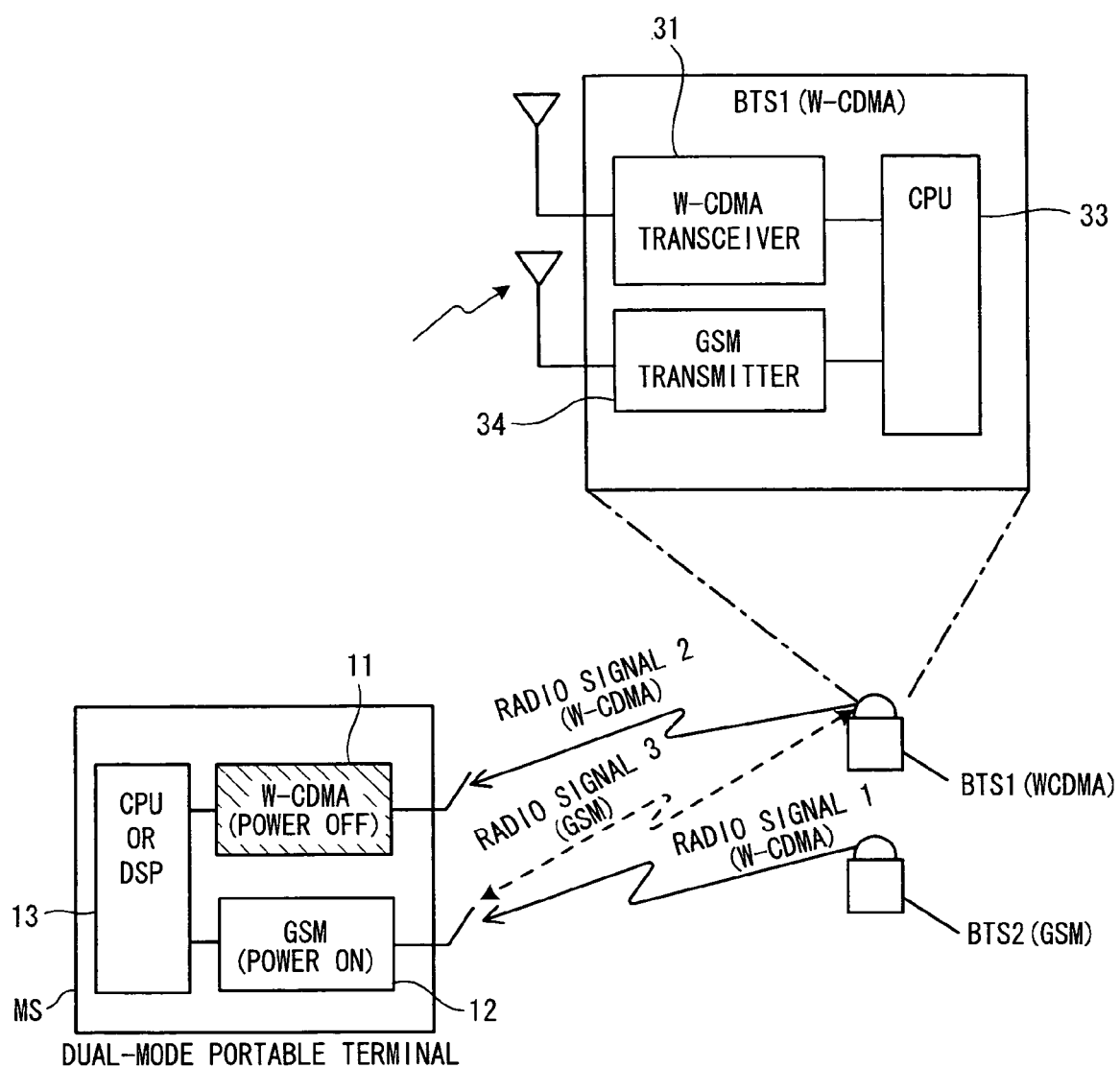
FIG. 21 is an explanatory view of a case where transmission of a GSM radio signal is started when a W-CDMA base station receives a GSM radio signal from a dual-mode portable terminal MS.

Further, as shown in FIG. 21, the W-CDMA base station BTS1 is equipped with a receiver (GSM transceiver) 34 in addition to a GSM transmitter. When the GSM radio signal 3 from the dual-mode portable terminal MS is received, the W-CDMA base station BTS1 starts transmitting the GSM radio signal; when the GSM radio signal 3 stops being received, the W-CDMA base station BTS1 stops transmitting the GSM radio signal. It should be noted that FIG. 21 corresponds to FIG. 2 and that the same components are designated by like reference characters.

Figure 22:
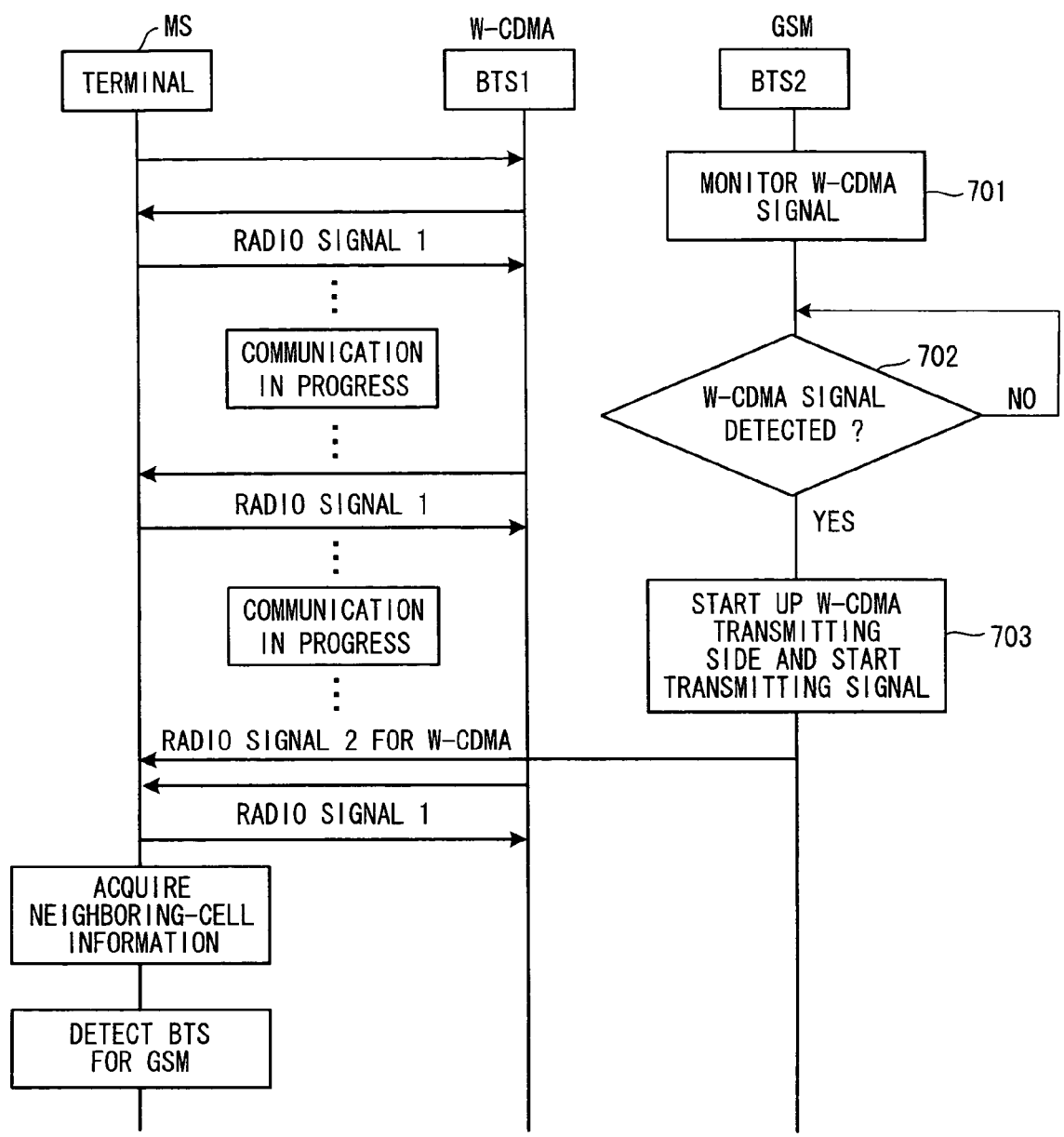
FIG. 22 is an explanatory view of a procedure for a case where a dual-mode portable terminal MS searches for neighboring cells while communicating with a W-CDMA base station BTS1.

FIG. 22 is an explanatory view of a procedure for a case where the dual-mode portable terminal MS searches for neighboring cells while communicating with the W-CDMA base station BTS1.

The dual-mode portable terminal MS is communicating with the W-CDMA base station BTS1. When the terminal MS moves and enters the area of the GSM base station BTS2 (a region reached by radio waves from the terminal MS), the GSM base station BTS2 detects the W-CDMA radio signal 3 from the terminal MS (steps 701, 702) and ascertains the fact that a wireless terminal operating in the W-CDMA mode is present nearby. If the existence of the wireless terminal operating in the W-CDMA mode is detected, then the controller 23 of the GSM base station BTS2 starts up the transmitter of the W-CDMA transceiver 24 and starts transmitting the W-CDMA radio signal 2 (step 703). As a result, the dual-mode portable terminal MS is capable of identifying the existence of the GSM base station BTS2 when neighboring-cell information is acquired.

(F) Operation of Dual-Mode Portable Terminal

Figure 23:
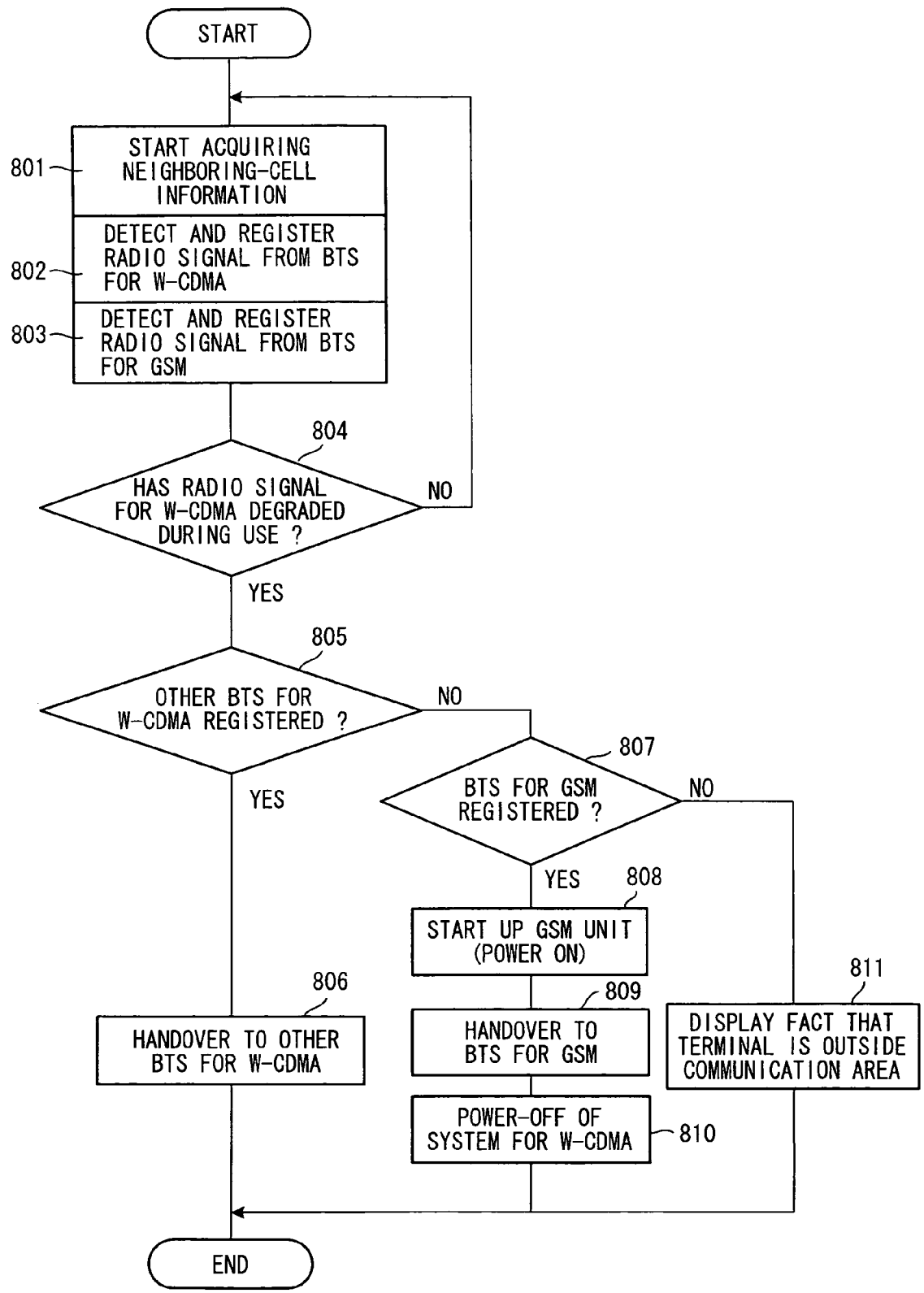
FIG. 23 is a flowchart for describing operation of a dual-mode portable terminal.

FIG. 23 is a flowchart for describing operation of a dual-mode portable terminal.

In a case where the controller 13 of the dual-mode portable terminal MS is traveling while communicating in the W-CDMA mode, the controller causes the W-CDMA unit 11 to acquire neighboring-cell information periodically (step 801). If a neighboring W-CDMA base station and a neighboring GSM base station are found, these are registered (steps 802, 803). The controller thenceforth performs monitoring to determine whether the radio signal being used in communication has degraded (step 804) and, if degradation has occurred, selects another base station BTS the conditions of whose radio waves are better. If a W-CDMA base station BTS has been registered at the time of BTS selection ("YES" at step 805), then a changeover is made to the W-CDMA base station between communication modes that are the same. In other words, handover is performed (step 806).

On the other hand, if it is found at step 805 that a base station BTS in the same communication mode (a W-CDMA base station) is not present in the neighboring-cell, then it is determined whether a GSM base station BTS has been registered (step 807). If this base station exists, then the GSM unit 12 within the terminal is started up (step 808) and handover to GSM is performed after the necessary procedure is followed (step 809). The power supply of the W-CDMA system not used is subsequently turned off (step 810). It should be noted that if it is found at step 807 that a GSM base station BTS has not been registered, then a display indicating that the terminal is outside the communication area is presented (step 811) and processing is exited.

Thus, in accordance with the present invention, as described above, consumption of a terminal battery can be suppressed. An example will be illustrated by calculation. In a case where the terminal is operating in the W-CDMA mode, assume that consumed current in the W-CDMA unit 11 of the terminal is 200 mA, that consumed current in the controller (CPU) is 100 mA, that consumed current in the GSM unit 12 is 120 mA, that the interval at which neighboring-cell information of a GSM base station is acquired is 1 sec and that the acquisition period (from power-on to end of measurement) is 500 ms. Consumed current according to the prior art is as follows:

200+100+(120×500/1000)=360 mA

By contrast, consumed current according to the present invention is as follows because the GSM power supply is not turned on:

200+100=300 mA

Accordingly, if use is made of a 700-mAh battery, then the lifetime of the battery in the prior art is as follows:

700 mAh/360 mA=117 minutes whereas battery lifetime according to the present invention is as follows:

700 mAh/300 mA=140 minutes

Thus, consumption of current can be suppressed by an amount equivalent to about 23 minutes in comparison with the prior art.

Further, in a case where the dual-mode portable terminal MS is operating in the GSM mode, consumed current according to the prior art is as follows:

120+100+(200×500/1000)=320 mA

By contrast, consumed current according to the present invention is as follows because the W-CDMA power supply is not turned on:

120+100=220 mA

Accordingly, if use is made of a 700-mAh battery, then the lifetime of the battery in the prior art is as follows:

700 mAh/320 mA=131 minutes whereas battery lifetime according to the present invention is as follows:

700 mAh/220 mA=191 minutes

Thus, consumption of current can be suppressed by an amount equivalent to about 60 minutes in comparison with the prior art.

The first wireless communication mode is described as being W-CDMA and the second wireless communication mode is described as being GSM above. However, the present invention is not limited to such case. The first wireless communication mode may be W-CDMA and the second wireless communication mode may be PDC. The present invention is applicable generally to any combination of communication modes.

Thus, in accordance with the present invention, it is so arranged that whether base stations of mobile communication modes exist in the neighboring-cell can be recognized by turning on the power supply only of the unit conforming to the mobile communication mode currently in operation and leaving the power supplies of units conforming to other mobile communication modes off.

What is claimed is:

1. A multi-mode system for performing communication using a terminal equipped with first and second units capable of communicating in first and second mobile communication modes, respectively, in a multi-mode environment of a first mobile communication mode and a second mobile communication mode, characterized in that:

a base station of the first mobile communication mode communicates with a terminal in the first mobile communication mode and transmits a radio signal in the second mobile communication mode;

a base station of the second mobile communication mode communicates with a terminal in the second mobile communication mode and transmits a radio signal in the first mobile communication mode; and the first unit of a terminal communicates with the base station of the first mobile communication mode in the first mobile communication mode, receives the radio signal of said first mobile communication mode transmitted from the base station of the second mobile communication mode and determines based upon said radio signal whether the base station of said second mobile communication mode exists, and the second unit of the terminal communicates with the base station of the second mobile communication mode in the second mobile communication mode, receives the radio signal of said second mobile communication mode transmitted from the base station of the first mobile communication mode and determines based upon said radio signal whether the base station of said first mobile communication mode exists.

2. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a GSM/PDC base station transmits Primary Synchronization Channel (P-SCH) as said radio signal and the terminal identifies existence of the GSM/PDC base station based upon whether or not said P-SCH is present.

3. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a GSM/PDC base station transmits Primary Synchronization Channel (P-SCH) and Secondary Synchronization Channel (S-SCH) as said radio signal and the terminal has a correspondence table of correspondence between code-group numbers and network types, identifies a code-group number of a neighboring base station from S-SCH and identifies existence of the GSM/PDC base station from said identified code-group number of the base station and said correspondence table.

4. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a GSM/PDC base station transmits Primary Synchronization Channel (P-SCH), Secondary Synchronization Channel (S-SCH) and Common Pilot Channel (CPICH) as said radio signal and the terminal has a correspondence table of correspondence between scrambling codes and network types, identifies a scrambling code of a neighboring base station from CPICH and identifies existence of the GSM/PDC base station from said identified scrambling code and said correspondence table.

5. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a GSM/PDC base station transmits Primary Synchronization Channel (P-SCH), Secondary Synchronization Channel (S-SCH), Common Pilot Channel (CPICH) and Primary Common Control Physical Channel (PCCPCH) as said radio signal and the terminal identifies existence of the GSM/PDC base station from Broadcast Channel (BCH) information in said PCCPCH.

6. The multi-mode system according to claim 1, characterized in that an area reached by the radio signal of the first mobile communication mode transmitted from a base station of the second mobile communication mode is made smaller than or equal to an area of the second mobile communication mode.

7. The multi-mode system according to claim 1, characterized in that a base station of the second mobile communication mode has a receiver of the first mobile communication mode in addition to a transmitter of the first mobile communication mode, and said transmitter transmits a radio signal of the first mobile communication mode when a radio signal of the first mobile communication mode from a terminal communicating in the first mobile communication mode is received.

8. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a W-CDMA base station transmits Frequency Correction Channel/Synchronization Channel (FCCH/SCH), which is a synchronization channel, as said radio signal, and the terminal identifies existence of the W-CDMA base station based upon establishment of synchronization with SCH.

9. The multi-mode system according to claim 1, characterized in that when said first mobile communication mode is Wideband-Code Division Multiple Access (W-CDMA) and the second mobile communication mode is Global System for Mobile Communication (GSM) or Personal Cellular Telecommunication System (PDC), a W-CDMA base station sends Broadcasting Control Channel (BCCH) in addition to Frequency Correction Channel/Synchronization Channel (FCCH/SCH), which is a synchronization channel, as said radio signal, and the terminal identifies existence of the W-CDMA base station using information in BCCH.

10. A multi-mode wireless terminal capable of communicating in each of first and second mobile communication modes in a multi-mode environment of a first mobile communication mode and a second mobile communication mode, characterized by having:
    first and second units for communicating in the first and second mobile communication modes, respectively;
    said first unit communicating with a base station of the first mobile communication mode in the first mobile communication mode, receiving a radio signal of the first mobile communication mode transmitted from a base station of the second mobile communication mode and determining based upon said radio signal whether the base station of said second mobile communication mode exists; and
    said second unit communicating with the base station of the second mobile communication mode in the second mobile communication mode, receiving the radio signal of the second mobile communication mode transmitted from the base station of the first mobile communication mode and determining based upon said radio signal whether the base station of said first mobile communication mode exists.

* * * * *